US010817526B2

(12) United States Patent
Jones et al.

(10) Patent No.: US 10,817,526 B2
(45) Date of Patent: Oct. 27, 2020

(54) SYSTEMS AND METHODS FOR SEARCHING A MACHINING KNOWLEDGE DATABASE

(71) Applicant: Machine Research Corporation, Wilsonville, OR (US)

(72) Inventors: Richard Thomas Jones, Lake Oswego, OR (US); Brian Dean McCabe, Portland, OR (US); Christopher John Skubic, Portland, OR (US)

(73) Assignee: Machine Research Corporation, Wilsonville, OR (US)

( * ) Notice: Subject to any disclaimer, the term of this patent is extended or adjusted under 35 U.S.C. 154(b) by 148 days.

(21) Appl. No.: 14/799,421

(22) Filed: Jul. 14, 2015

(65) Prior Publication Data

US 2016/0019270 A1  Jan. 21, 2016

Related U.S. Application Data

(60) Provisional application No. 62/025,417, filed on Jul. 16, 2014, provisional application No. 62/025,427, filed on Jul. 16, 2014.

(51) Int. Cl.
*G06F 16/248* (2019.01)
*G05B 19/4097* (2006.01)

(52) U.S. Cl.
CPC ....... *G06F 16/248* (2019.01); *G05B 19/4097* (2013.01); *G05B 2219/35003* (2013.01);
(Continued)

(58) Field of Classification Search
CPC .............................................. G06F 17/30554
See application file for complete search history.

(56) References Cited

U.S. PATENT DOCUMENTS 5,828,575 A   10/1998  Sakai
5,864,482 A *  1/1999  Hazama ............. G05B 19/4097
                                                          700/182

(Continued)

FOREIGN PATENT DOCUMENTS

CN           103309995         9/2013
EP           0508308 B1        3/1998
(Continued)

OTHER PUBLICATIONS

English-language machine translation of China Patent Publication No. CN 103309995, dated Sep. 18, 2013.

(Continued)

*Primary Examiner* — Mark D Featherstone
*Assistant Examiner* — Tony Wu
(74) *Attorney, Agent, or Firm* — Dascenzo Intellectual Property Law, P.C.

(57) ABSTRACT

The present disclosure relates to systems and methods for searching a machining knowledge database that includes stored 3D models and associated stored part signatures. The stored part signatures each include a shape metric that corresponds to geometric attributes of the corresponding 3D model. Methods include receiving input from a user relating to an input part, determining an input part signature that includes a shape metric that corresponds to geometric attributes of the input part, searching the machining knowledge database for similar 3D models based at least in part on the input part signature, and providing the search result to the user. Methods may include associating the input in the machining knowledge database and/or utilizing the search result, for example visualizing a comparison of the input and the search result.

24 Claims, 4 Drawing Sheets

(52) U.S. Cl.
CPC ........... *G05B 2219/35134* (2013.01); *G05B 2219/35152* (2013.01); *Y02P 90/02* (2015.11)

(56) References Cited

U.S. PATENT DOCUMENTS

| | | | |
|---|---|---|---|
| 5,886,897 | A | 3/1999 | Hazama et al. |
| 5,971,589 | A | 10/1999 | Hazama et al. |
| 6,775,647 | B1 | 8/2004 | Evans et al. |
| 6,795,749 | B2 | 9/2004 | Suh et al. |
| 7,058,472 | B2 | 6/2006 | Mathews et al. |
| 7,155,375 | B1 | 12/2006 | Rimoldi et al. |
| 7,168,935 | B1 | 1/2007 | Taminger et al. |
| 7,228,196 | B2 | 6/2007 | Dai et al. |
| 7,266,419 | B2 | 9/2007 | Sakai et al. |
| 7,639,868 | B1 | 12/2009 | Regli et al. |
| 8,340,807 | B1 | 12/2012 | Rodrigue et al. |
| 8,429,174 | B2 | 4/2013 | Ramani et al. |
| 8,490,000 | B2 | 7/2013 | Okuwaki et al. |
| 8,606,774 | B1 | 12/2013 | Makadia et al. |
| 8,686,992 | B1 | 4/2014 | Makadia |
| 8,812,272 | B2 | 8/2014 | Martin et al. |
| 9,002,501 | B1 | 4/2015 | Rodrigue et al. |
| 9,101,991 | B1 | 8/2015 | Tingley, III et al. |
| 9,227,323 | B1 | 1/2016 | Konolige et al. |
| 9,405,773 | B2 | 8/2016 | Chittar et al. |
| 2003/0208293 | A1* | 11/2003 | Mountcastle, III ........................ G05B 19/41865 700/96 |
| 2003/0210244 | A1* | 11/2003 | Sasago ............... G06T 19/00 345/419 |
| 2004/0249809 | A1* | 12/2004 | Ramani ............. G06F 17/30259 |
| 2005/0113962 | A1 | 5/2005 | Matthews et al. |
| 2006/0062448 | A1 | 3/2006 | Hirsch et al. |
| 2006/0129461 | A1* | 6/2006 | Pankl ................ G05B 19/4097 705/26.81 |
| 2006/0182347 | A1 | 8/2006 | Kim et al. |
| 2006/0253403 | A1* | 11/2006 | Stacklin ............. G06Q 10/00 705/400 |
| 2007/0008312 | A1 | 1/2007 | Zhou et al. |
| 2007/0027845 | A1 | 2/2007 | Dettinger et al. |
| 2008/0056581 | A1 | 3/2008 | Yamaguchi et al. |
| 2008/0201002 | A1 | 8/2008 | Crew et al. |
| 2008/0215427 | A1 | 9/2008 | Kawada et al. |
| 2008/0219596 | A1 | 9/2008 | Shiitani et al. |
| 2009/0060393 | A1 | 3/2009 | Satoh |
| 2010/0100457 | A1 | 4/2010 | Rathod et al. |
| 2010/0278382 | A1 | 11/2010 | Chapman et al. |
| 2012/0179272 | A1 | 7/2012 | Dignam et al. |
| 2012/0232857 | A1* | 9/2012 | Fisker ................ B29C 33/3835 703/1 |
| 2012/0329008 | A1 | 12/2012 | Fishman et al. |
| 2013/0066447 | A1 | 3/2013 | Baierl-Moehler et al. |
| 2013/0116926 | A1 | 5/2013 | Rodney et al. |
| 2013/0311450 | A1 | 11/2013 | Ramani et al. |
| 2013/0316305 | A1* | 11/2013 | Carden ................ A61K 6/0088 433/202.1 |
| 2013/0329243 | A1 | 12/2013 | Pettis et al. |
| 2013/0329257 | A1 | 12/2013 | Pettis et al. |
| 2013/0329258 | A1 | 12/2013 | Pettis et al. |
| 2014/0019299 | A1 | 1/2014 | Stewart |
| 2014/0035182 | A1 | 2/2014 | Boyer et al. |
| 2014/0039659 | A1 | 2/2014 | Boyer et al. |
| 2014/0156053 | A1 | 6/2014 | Madhavi et al. |
| 2014/0163711 | A1* | 6/2014 | Matsubara ............... G06K 9/00 700/103 |
| 2015/0186457 | A1 | 7/2015 | Enomoto et al. |
| 2015/0269290 | A1* | 9/2015 | Nelaturi .............. G06F 17/5009 703/6 |

FOREIGN PATENT DOCUMENTS

| | | |
|---|---|---|
| JP | 2005-92274 A | 4/2005 |
| KR | 1020140023154 | 2/2014 |
| WO | 2014/091543 A1 | 6/2014 |
| WO | WO 2015/022572 | 2/2015 |

OTHER PUBLICATIONS

English-language machine translation of Korea Patent Publication No. KR 1020140023154, dated Feb. 26, 2014.
Funkhouser et al., "A Search Engine for 3D Models," *ACM Transactions on Graphics*, 22:1, pp. 83-105, 2003.
Benavente et al., "A Web-Based System for the Design and Manufacture of Feature-Based Prismatic Parts," *19th International Congress of Mechanical Engineering*, Nov. 5-9, 2007.
Allen et al., "AB-CAM: An Agent-Based Methodology for the Manufacture of Step Compliant Feature Based Components," In: *Metal Cutting and High Speed Machining*. Edited by Dudzinski, et al., Kluwer Academic/Plenum, pp. 351-362, 2002. ISBN 0-306-46725-9.
Amaitik, "Development of a Step Feature-Based Intelligent Process Planning System for Prismatic Parts," a thesis submitted to the Graduate School of Natural and Applied Science of Middle East Technical University, Apr. 2005.
Zhang, et al., "Feature Recognition from CNC Part Programs for Milling Operations," *International Journal of Advanced Manufacturing Technology*, No. 70, pp. 397-412, 2014.
Albert, "Getting to Know Knowledge-Based Machining," *Modern Machine Shop*, 75:6, p. 64, Nov. 2002.
Rea, et al., "Commercial and Business Issues in the E-Sourcing and Reuse of Mechanical Components," *International Journal of Advanced Manufacturing Technology*, No. 30, pp. 952-958, 2006.
English-language machine translation of Japan Patent No. 2005-92274A, dated Apr. 7, 2005.
English-language machine translation of PCT Patent Application Publication No. 2014/091543A1, dated Jun. 19, 2014.

* cited by examiner

SYSTEMS AND METHODS FOR SEARCHING A MACHINING KNOWLEDGE DATABASE

RELATED APPLICATIONS

This application claims priority to U.S. Provisional Patent Application Ser. No. 62/025,417, entitled "SYSTEMS AND METHODS FOR REUSING MACHINING CODE," which was filed on Jul. 16, 2014, and U.S. Provisional Patent Application Ser. No. 62/025,427, entitled "SYSTEMS AND METHODS FOR EXTRACTING MACHINING CODE FOR REUSE," which was filed on Jul. 16, 2014, the complete disclosures of which are hereby incorporated by reference for all purposes.

FIELD

The present disclosure relates to systems and methods for searching a machining knowledge database.

BACKGROUND

Mechanical part design and fabrication often follows a common paradigm. Parts are modeled using tools such as computer-aided design (CAD) systems and/or 3D data capture systems (which, e.g., sample surfaces of the physical object). The resulting geometrical model of the part is a 3D (three-dimensional) model that may be manipulated, analyzed, and/or modified. The geometrical model often is a solid model of the part to be fabricated.

When ready to fabricate the part according to the 3D model, the model and auxiliary data, such as materials, processes, dimensions, and tolerances, are transformed into electronic instructions to control a target forming machine. The transformation process typically is assisted by a computer-aided manufacturing (CAM) system. The resulting electronic instructions ("machining code") typically are in the form of a numerical control (NC) programming language such as the G-codes and M-codes defined by the by ISO 6983/RS274D standards (generally called "G-code").

The 3D model, work instructions, the machining code, and processing information relating to fabricated parts embody knowledge to recreate the original part and knowledge of how to create similar parts. Preservation, dissemination, and/or use of this knowledge (referred to as machining knowledge) may benefit fabricators and purchasers of fabricated parts by reducing the effort to produce and/or reproduce future parts. For example, recognizing similar parts already fabricated may provide insight into the fabrication of new parts. As another example, reviewing, modifying, and/or re-executing previous machining code may enhance apprentice operators' training and experienced operators' productivity.

SUMMARY

The present disclosure relates to systems and methods for searching a machining knowledge database. The machining knowledge database includes stored 3D models and associated stored part signatures. The stored part signatures each include a shape metric that corresponds to geometric attributes of the corresponding stored 3D model.

Methods for utilizing stored information of the machining knowledge database include providing a search query that describes an input part, requesting a search of the machining knowledge database for stored 3D models that are similar to the input part, receiving a search result including one or more stored 3D models from the machining knowledge database that are similar to the input part, comparing the input part to the search result, and reviewing machining code associated with at least one of the stored 3D models of the search result. The search requested is based at least upon one or more geometric attributes of the input part and one or more physical properties relating to the input part.

Methods for querying the machining knowledge database include receiving, from a user, a search query that describes an input part, determining an input part signature that includes a shape metric that corresponds to geometric attributes of the input part, searching the machining knowledge database for stored 3D models that are similar to the input part, generating a search result that includes one or more of the stored 3D models of the machining knowledge database that are similar to the input part, and providing a visual comparison of the search query and the search result to the user. The search is based at least upon the input part signature.

Methods for searching the machining knowledge database include receiving, from a user, an input representation of an input part, determining an input part signature that includes a shape metric corresponding to geometric attributes of the input part, associating the input representation with the input part signature in the machining knowledge database, searching the machining knowledge database for stored 3D models that are similar to the input part, generating a search result that includes one or more of the stored 3D models of the machining knowledge database that are similar to the input part, and providing the search result to the user. The search is based at least upon the input part signature.

DESCRIPTION

Figure 1:
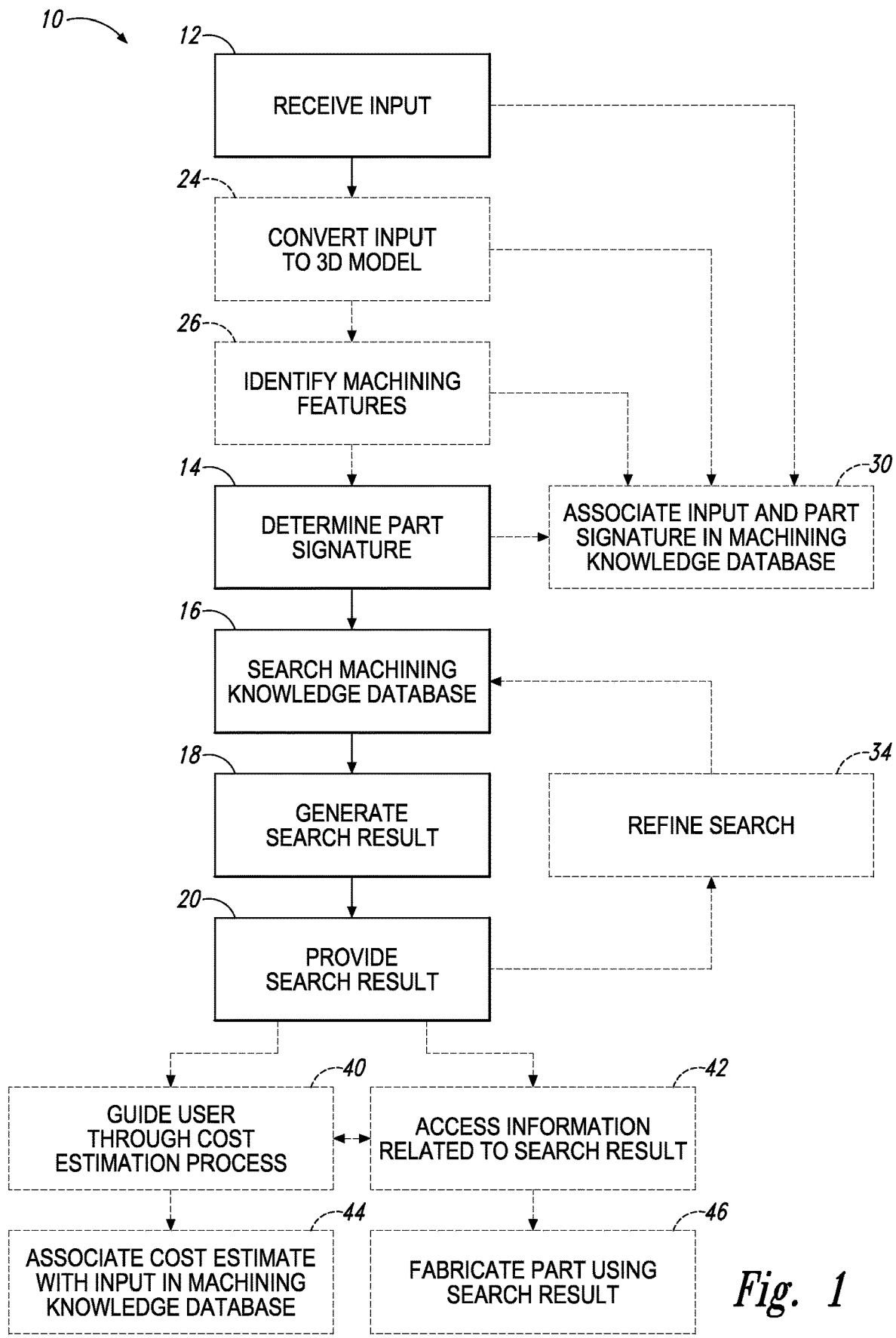
FIG. 1 is a schematic representation of methods according to the present disclosure.

FIGS. 1-7 illustrate systems and methods for searching a machining knowledge database according to the present disclosure. Elements that serve a similar, or at least substantially similar, purpose are labeled with numbers consistent among the figures. Like numbers in each of the figures, and the corresponding elements, may not be discussed in detail herein with reference to each of the figures. Similarly, all elements may not be labeled in each of the figures, but reference numerals associated therewith may be used for consistency. Elements, components, and/or features that are discussed with reference to one or more of the figures may be included in and/or used with any of the figures without departing from the scope of the present disclosure. In the figures, elements that are likely to be included in a given embodiment are illustrated in solid lines, while elements that are optional or alternatives are illustrated in dashed lines. However, elements that are illustrated in solid lines are not essential to all embodiments of the present disclosure, and an element shown in solid lines may be omitted without departing from the scope of the present disclosure.

FIG. 1 schematically represents methods 10 for searching a machining knowledge database according to the present disclosure. The machining knowledge database includes stored 3D models associated with respective stored part signatures. Each stored part signature corresponds to attributes of the associated stored 3D model. Methods 10 may include receiving 12 user input relating to an input part, determining 14 an input part signature corresponding to attributes of the input part, searching 16 the machining knowledge database for one or more stored 3D models of formed parts that are similar to the input part, generating 18 a search result that includes one or more of the stored 3D models of the machining knowledge database that are similar to the input part, and providing 20 the search result to the user. The input part generally is a part to be fabricated but may be a formed part. Where used, a user may be a person (e.g., an operator, a programmer, a machinist, etc.), a client device, and/or a client process. The user may utilize the stored information of the machining knowledge database as described further herein.

The machining knowledge database includes data objects (e.g., the stored 3D models) and associations (relationships) between those objects. The machining knowledge database is a database, typically a relational and/or an object-oriented database. The machining knowledge database includes a file store (a repository of information/data stored in non-transitory storage, i.e., computer-readable media, and typically organized by a file system), an object store (a repository of relationships/associations among the data), and an optional index store (a repository of indices that point to particular relationships and/or data). The indices generally are configured to facilitate the search and identification of data within the machining knowledge database.

A reference to "machining" in this disclosure is also a reference to any and/or all techniques useful to create real, physical parts (referred to as machined or formed parts). Unless the context clearly indicates otherwise, "machining" is used synonymously with "forming" and "fabricating." For example, the CAD/CAM process is effective for fabricating parts using a variety of forming machines and forming processes, e.g., machining, milling, turning, molding, casting, stamping, folding, coating, assembling, and/or additive manufacturing (also referred to as 3D printing). Formed parts may be formed by any combination of fabrication techniques. Forming machines may be configured to perform and/or may perform any combination of fabrication techniques.

The machining knowledge database includes 3D models (i.e., stored 3D models) of parts and associated part signatures (i.e., stored part signatures). 3D models are digital descriptions of a part, a formed part, a designed part, a desired part, and/or a hypothetical part. Most, substantially all, or all of the stored 3D models of the machining knowledge database are 3D models of formed parts. 3D models may be in any suitable form or format, with examples including a solid model, a 3D polygonal mesh (e.g., a surface tessellation format and/or a STL file), a 3D wireframe, 3D surface descriptions, a 3D solid, and/or a 3D topology (boundary representation). All or substantially all of the 3D models of the machining knowledge database may be stored in the same form or format. 3D models may be produced by and/or derived from a CAD system (e.g., a CAD model), a CAM system (e.g., a CAM model), a 3D scanner, and/or modeling software. 3D models may describe virtually any type of three-dimensional object, including raw material, a stock piece, a workpiece (before, during, and/or after fabrication), a fixture, a tool, and a forming machine.

A forming machine is a machine that is configured to transform raw material into a formed part. Forming machines are computer-controlled devices (e.g., an NC machine, a 3D printer, etc.) that are configured to form a part according to instructions (e.g., machining code) provided by a user. Hence, forming machines may be described as automatic, semi-automatic, robotic, numeric-controlled, computer-controlled, and/or computerized. A forming machine may transform the raw material by subtractive manufacturing techniques (e.g., machining), additive manufacturing techniques (e.g., 3D printing), molding, casting, folding, stamping, coating, etc. For some techniques, such as molding, casting, stamping, etc., a forming machine also may be employed to form a component (e.g., a mold, a cast, a stamp, a die, etc.) that subsequently is utilized to form other parts. Hence, a forming machine may be used to fabricate a mold, a cast, a die, etc., that subsequently is used in a forming machine to fabricate a finished part. Forming machines are configured to operate one or more tools to form the part. Additionally, forming machines may include one or more other, typically automated, components such as chucks, spindles, stages, indexers, trunnions, carousels, robotic arms, cooling systems, venting systems, and/or waste collection systems. Forming machines may be, and/or may include, assembled machines, such as NC machines and/or 3D printers, and may be an assemblage of one or more such machines and interconnecting components (e.g., materials handling components).

The raw material is the material used by a forming machine to form a formed part. The raw material, which also may be called feedstock, typically is in the form of a stock piece. For example, for machining operations, a stock piece may be plate, block, or bar stock, or it may be a rough-formed part (e.g., a cast part). The stock part typically is composed of a substantially uniform material, such as a metal, metal alloy, or polymer, although this is not required. For additive manufacturing operations, raw material may be bulk liquid polymer (or polymer precursor), catalyst, and/or reactant, and may include, or may be, solids in the form of grains, powder, wires, bulk solids, and/or sheets.

A workpiece is a part as it is being produced, i.e., a partially completed part. Upon beginning the manufacturing process, the raw material (e.g., stock piece) becomes the workpiece. Upon completing the manufacturing process, the workpiece becomes the formed part. The completed workpiece may be a finished, formed part or may be a formed part that is intended for further processing, such as finishing, polishing, heat treating, coating, and/or further forming processes.

Forming machines and/or forming processes may include and/or use a fixture to facilitate the fabrication of a part. A fixture is a component that is used with a workpiece to hold, support, and/or otherwise facilitate the fabrication. A fixture may be a general purpose component or a custom part that is fabricated for the manufacture of a single part or a single type of part. The machining knowledge database may associate the use of a fixture and/or data describing the fixture with a stored 3D model. For example, stored 3D models may be associated with corresponding fixture 3D models, fixture types, fixture part numbers, etc. that describe the respective fixture that was used to fabricate the formed part corresponding to the stored 3D model. Where present, the fixture 3D model may be one of the stored 3D models in the machining knowledge database, i.e., the fixture 3D model may be stored, associated, and/or indexed in the same manner as the other stored 3D models.

Machining code includes a group of computer-readable instructions for a targeted forming machine and may include forming code, code for a forming machine, code for a 3D printer, code for a NC machine, code for a robot, and/or G-code. In fundamental terms, machining code is a description of what to make and how to make it. Machining code generally includes instructions that describe the configuration, operation, and/or processing of the forming machine, what tools to use, the tool setup, and the trajectories of the tools (toolpaths). Machining code may include all or a portion of the instructions to make a part. For example, different blocks of machining code may direct the fabrication of different features of a part. Machining code may be directed to a forming machine generally, may be directed to components of a forming machine, and/or may be directed to different forming machines. For example, one type of machining code may control an NC machine while another type of machining code may control a materials-handling robot.

Parts are formed following a machining strategy (which also may be called a machining plan, a forming strategy, and/or a forming plan). The machining strategy is the specific configuration and operation of the forming machine, or forming machines, to create the formed part. The machining strategy includes a sequence of one or more machining operations that, when performed in order, on the targeted forming machine, with the specified tools, raw materials, and/or fixtures, create the formed part. Machining code that expresses, describes, and/or instructs a machining strategy is referred to as machining strategy code.

Machining operations (which also may be called machining stages, forming machine operations, and/or forming machine stages) are units of processing of the part (i.e., workpiece) as it is being formed. Each machining operation includes a sequence of one or more toolpaths that direct the forming machine to deposit, remove, form, and/or shape a workpiece. A machining operation may include associated forming machine and/or tool configurations, operations, and/or processes, for example, cooling configuration, waste management (e.g., ventilation, waste containment), workpiece setup (e.g., transport, orientation, fixturing), tool choice (e.g., tool exchange), and/or tool setup (e.g., orientation, spindle speed, temperature, dispense rate). Machining code that expresses, describes, and/or instructs a machining operation is referred to as machining operation code.

Toolpaths, also called trajectories, are units of tool movement. A toolpath may include positioning portions and/or active portions. As used herein, a positioning portion of a toolpath refers to a portion of the toolpath in which material is not added to or removed from the corresponding workpiece, and an active portion of a toolpath refers to a portion of the toolpath in which material is added to or removed from the workpiece. For example, a toolpath may include instructions for positioning (including moving, orienting, and/or locating) a tool relative to the workpiece and/or instructions for affecting the shape of the workpiece (e.g., by cutting, polishing, dispensing, and/or polymerizing). Each toolpath includes a sequence of steps that configures and/or moves a tool relative to the workpiece and/or components of a forming machine. The toolpath may include the specific speed and displacements to achieve a specific motion. Generally, execution of a toolpath results in modification of the workpiece (i.e., each toolpath generally includes an active portion). Machining code that expresses, describes, and/or instructs a toolpath may be referred to as toolpath code.

Toolpaths include a series of command positions that command the forming machine to move the tool to a location (specifying position and/or orientation). Toolpaths also include operational parameters of the tool and/or forming machine that specify how the tool is operating relative to the workpiece. For example, toolpaths may specify spindle speed, feed speed, tool displacement speed, operational pressure, operation temperature, etc.

A tool, which also may be called a forming tool, a machining tool, a cutter, and/or a print head, is a potentially interchangeable component of a forming machine configured to impart (by adding material, removing material, and/or shaping material) new form to the workpiece. Examples of tools include a milling cutter, a drill bit, a cutting tool, a tool bit, a rotary file, a laser source, an electron beam source, an extruder head, and a nozzle.

Formed parts (completed workpieces) and 3D models may be logically and/or structurally composed (though not necessarily exclusively composed) of one or more machining features. A machining feature is a surface or a group of surfaces formed by a tool. Hence, though a machining feature may have functional value, a machining feature is a structure and/or a structural characteristic rather than a functional characteristic. Examples of machining features include a hole, a pocket, a plane, a contour, and a protrusion. A machining feature is typically the result of one or more toolpaths, and/or the result of a machining operation. Machining code that expresses, describes, and/or instructs sufficient operations to form a machining feature may be referred to as machining feature code and/or feature code.

Machining features may be described by the surfaces of the formed part and/or may be described by a 3D model (e.g., a solid model) that includes surfaces corresponding to the formed part. 3D models of machining features may be referred to as machining feature models. Particularly for machining features formed by subtractive manufacturing methods, machining features may be described by negative geometry and/or a negative geometry model (a 3D model). The negative geometry and the negative geometry model describe the volume of material removed from an actual or hypothetical stock piece to form the surfaces of the machining feature. Where a hypothetical stock piece is used as a reference, the stock piece may be modeled as a bounding box around the formed part. Particularly for machining features formed by additive manufacturing methods, machining features may be described by positive geometry and/or a positive geometry model (a 3D model). The positive geometry and the positive geometry model describe the volume of material added to a workpiece, an actual stock piece, or a hypothetical stock piece. Each machining feature generally is the result of one or more toolpaths that affect the shape of the workpiece and thus form the machining feature.

Machining features may include, and/or may be described as, one or more sub-features. For example, machining features may be logically decomposed into a set of primitive shapes, such as a geon (a simple 2D or 3D form, such as a cylinder, brick, wedge, cone, circle, sphere, rectangle, etc.), a plane, a pocket, a hole, and/or a contour. Each of the primitive shapes may be a machining feature and may have identifiable machining code associated with the creation of the primitive shape.

The machining knowledge database may include one or more machining features for at least one, optionally each, stored 3D model; and the machining knowledge database may associate at least one, optionally each, stored 3D model with one or more machining features of the stored 3D model. The machining feature models may be stored in the machining knowledge database as independent 3D models (i.e., stored 3D models of the machining knowledge database) and/or linked to the stored 3D model of the formed part (i.e., as a subset and/or a reference to a portion of the stored 3D model). The 3D model of a machining feature may be a negative geometry model, a positive geometry model, and/or a 3D model that includes surfaces corresponding to the formed part. The stored 3D model of the formed part may be stored, at least in part, in the machining knowledge database as a group of machining feature models, with each of the machining feature models corresponding to one or more machining features of the formed part.

The machining knowledge database is configured for searching for stored 3D models based at least in part on the stored part signatures. The stored part signatures may be an index and/or may be indexed for quick search and/or retrieval of stored 3D models within the machining knowledge database. Part signatures, which also may be referred to as digital signatures and digital fingerprints, include a shape metric corresponding to geometric attributes (e.g., the shape) of the corresponding part and 3D model. Thus, the machining knowledge database may be configured for searching by shape and/or other geometric attributes of the stored 3D models.

The machining knowledge database may group, associate, and/or relate stored 3D models with similar part signatures. For example, the shape metric of the part signature may include hierarchical components corresponding to geometric attributes of higher resolution in each level of the hierarchy. As an example, the shape metric may encode the volume and surface area as top level geometric attributes, and the number of vertices and edges as second level geometric attributes. Part signatures may be compared for similarity and/or grouped according to a similarity score. Such a similarity score may include, for example, a Euclidean distance between the compared part signatures and/or a correlation between the compared part signatures.

Shape metrics typically describe and/or are related to local and global geometric attributes, thus describing high resolution and low resolution details of respective 3D models. For example, the shape metric may be in the form of an attribute vector that encodes different geometric attributes (e.g., volume, surface area, number of edges, edge connectivity) along different dimensions of the attribute vector. As another example, the shape metric may encode a series of wavelets and/or Fourier coefficients (e.g., the result of a discrete wavelet and/or Fourier transformation). Further, the shape metric may be invariant under scaling, rotation, and/or translation transformations of the corresponding 3D model. Shape metrics may correspond to and/or encode one or more machining features of the respective part.

Part signatures also may include and/or may relate to physical properties relating to the respective part. For example, the part signature may include a physical metric that corresponds to one or more physical properties of the respective part. Physical properties may include the material type, a bounding box of the part, the volume of the part, a volume removed from a (real or hypothetical) stock piece, a volume added to a (real or hypothetical) stock piece, the mass, the density, the surface area, a surface finish, a surface treatment, and/or a surface coating.

The machining knowledge database may include, for one or more, and optionally each, formed part described by a stored 3D model, machining code that was used to form at least a portion of the formed part described by the respective stored 3D model. The machining knowledge database also may associate stored 3D models and the corresponding machining code (if any). Further, at least one, optionally each, of the machining features in the machining knowledge database may be associated with machining feature code. The machining feature code associated with the corresponding machining feature may be stored in the machining knowledge database as independent machining code blocks and/or linked to the machining code associated with the stored 3D model of the formed part (i.e., as a subset and/or a reference to a portion of the machining code associated with the 3D model of the formed part). The machining code associated with a stored 3D model may be stored, at least in part, in the machining knowledge database as a group of machining feature code blocks, with each of the machining feature code blocks including machining code that was used to form the corresponding machining feature of the formed part.

The machining knowledge database and/or the stored part signature may include auxiliary information associated with the stored 3D models and/or the corresponding parts. Auxiliary information may include and/or may be related to product and manufacturing information (PMI; e.g., dimensions, tolerance, surface finish, materials, etc.), forming type (type of forming process, e.g., subtractive manufacturing, milling, drilling, turning, additive manufacturing, molding, casting, stamping, folding, coating, and assembling), machine type (type, model, location, etc. of the targeted forming machine), material type (identity, quantity, quality, stock piece size, stock piece shape/model, etc.), part name, textual description of the formed part (e.g., shape and/or physical description, part name, part function, etc.), customer name, date of manufacture, actual production cost, and/or actual production time. Auxiliary information may include a production summary and/or a parameter related to production, for example, production cost, NRE (non-recurring engineering) cost, fabrication cost, production time, NRE time, fabrication time, and/or delivery time.

Further, at least one, and optionally each, of the machining features in the machining knowledge database may be associated with at least one of a production cost, a relative production cost, a production time, and a relative production time of the machining feature. The relative production cost and the relative production time are the fractional production cost and time, respectively, of the machining feature relative to the production cost and time, respectively, of the entire formed part. The production time of each machining feature may be determined by calculating the total time to execute the machining code corresponding to the machining feature. The time to execute the code may be based at least in part upon the tool trajectories (e.g., feeds and speeds of the forming machine). The production cost of each machining feature may be determined by multiplying the actual cost of forming the formed part by the relative production time of the machining feature (i.e., the production time of the machining feature divided by the production time of the entire formed part).

The machining knowledge database may be produced (e.g., created, constructed, and/or augmented) by receiving and/or extracting part data. Part data may be sourced from the user and/or from a file system and/or a file repository (such as an intranet, a network, and/or the internet). Methods of producing the machining knowledge database may include identifying a 3D model corresponding to a part, determining and/or receiving a part signature for the 3D model and corresponding part, and associating the 3D model and the part signature together in the machining knowledge database. Methods of producing the machining knowledge database may include identifying machining code for the formed part corresponding to the 3D model (i.e., machining code that was used to form at least a portion of the formed part) and associating the machining code with the corresponding 3D model in the machining knowledge database. The machining code in the machining knowledge database may be any type of machining code described herein, e.g., machining strategy code, machining operation code, toolpath code, machining feature code, and/or portions thereof.

Producing the machining knowledge database may include associating at least one of the 3D models with one or more machining features of the corresponding formed part. Machining features may be stored and/or associated as machining feature models, each typically a 3D model of the machining feature. The machining features may be associated with machining code (i.e., machining feature code) that was used to form the corresponding machining feature of the formed part.

The machining features may be identified by analyzing the 3D model of the formed part and/or by analyzing the machining code corresponding to the formed part. Analyzing may include decomposing the 3D model into machining features based upon surfaces, surface arrangements, primitive shapes, negative geometries, and/or positive geometries, as described herein with respect to identifying 26 machining features of the input.

Analyzing the 3D model may include decomposing, and/or parsing, the geometry of the 3D model into basic shapes such as common machining features (e.g., a plane, a pocket, a hole, and/or a contour) and/or geometric volumes (e.g., a generalized conic, a basis shape, and/or a geon). Generally, machining features may be identified from the 3D model by analyzing deviations from a stock piece 3D model (actual or estimated), a bounding box around the 3D model, and/or an included box wholly within the 3D model. For example, the largest-scale machining features may be discontinuous volumes that result from the volumetric difference between the stock piece 3D model (or a hypothetical stock piece such as a bounding box or an included box) and the 3D model. Each discontinuous volume may be identified as a separate machining feature and/or may be further decomposed into smaller and/or more primitive shapes, e.g., sub-features and/or shape primitives such as geons, planes, pockets, holes, and/or contours. Additionally or alternatively, the negative geometry and/or positive geometry of the 3D model may be separated into discontinuous volumes, where each discontinuous volume optionally is identified as a machining feature and/or further decomposed into machining features and/or primitive shapes.

Analyzing the machining code may include determining the 3D model of material added to and/or removed from the part (e.g., the workpiece and/or the stock piece) by one or more toolpaths (traversed by identified tools) described by the machining code corresponding to the formed part. For example, the 3D model of material added or removed may be determined by reverse simulating the machining code, or at least a subset of the machining code corresponding to a toolpath and/or a machining operation. Simulating machining code typically includes simulating the effects of the toolpaths and other operations of the machining code to transform a stock piece into the formed part. Reverse simulating machining code typically includes running the machining code in reverse and operating the toolpaths in reverse (including adding material for subtractive operations and subtracting material for additive operations) to transform the formed part into the stock piece. The 3D model of material added to or removed from the part may be separated into discontinuous volumes, where each discontinuous volume optionally is identified as a machining feature and/or further decomposed and/or parsed into machining features and/or primitive shapes (i.e., analyzed essentially in the same manner as analyzing the 3D model geometry). Additionally or alternatively, machining features may be identified with specific sections of machining code by parsing the machining code. Parsing the machining code may result in the identification of machining code sections that may be subject to reverse simulation and/or other processes. Machining code may be parsed and/or sectioned according to specific commands within the machining code, for example, tool selection commands, toolpaths, and/or machining operations.

Figure 2:
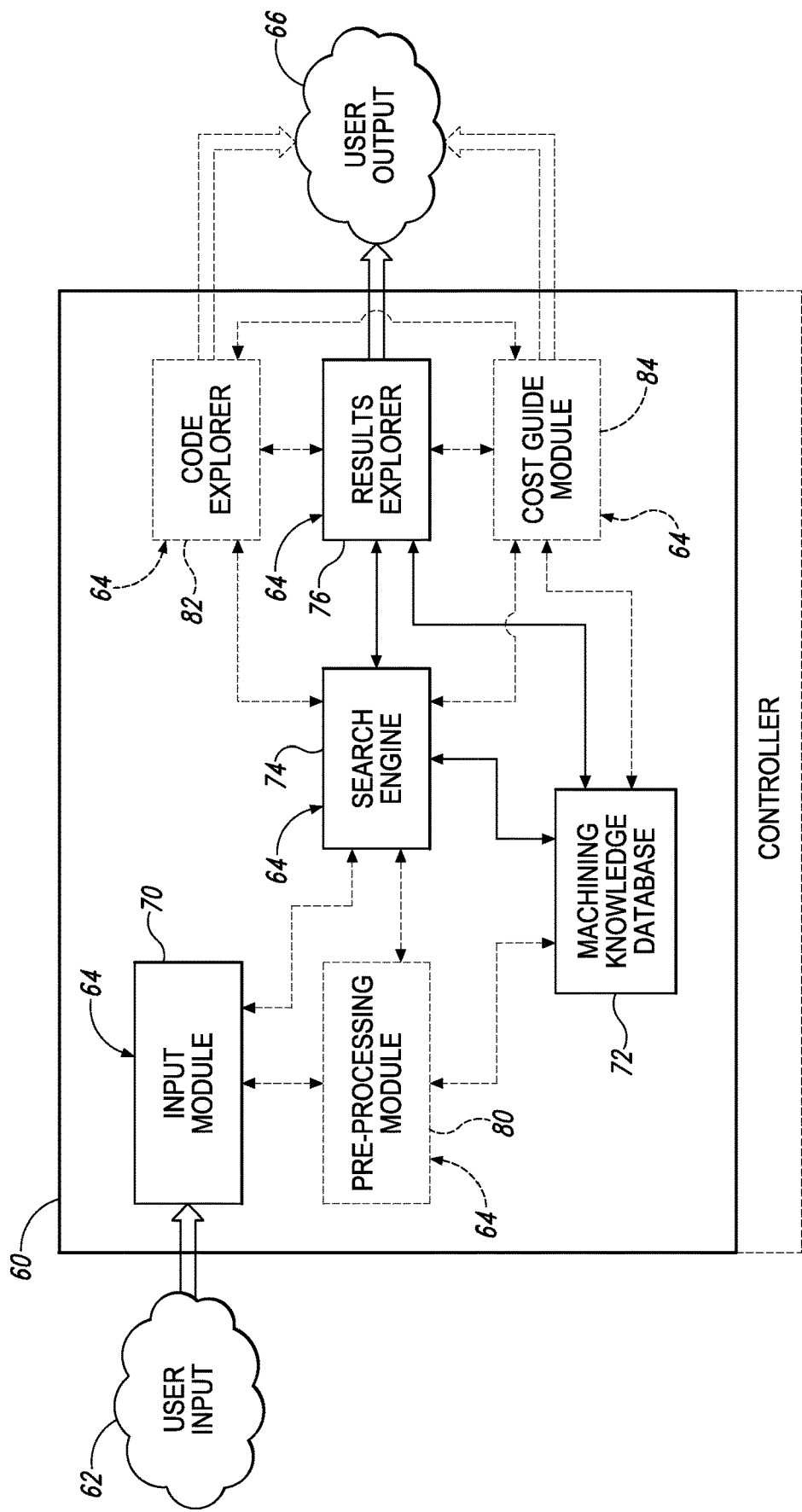
FIG. 2 is a schematic representation of examples of modules within a computerized system.

As shown in FIG. 1, methods 10 include receiving 12 input from a user. For example, the user may provide input to a search system (e.g., search system 60 as shown in FIG. 2 and described further herein). The input may be an input representation of the input part and/or a search query. The input representation and/or the search query may include, and/or may be, a 3D model, a 3D sketch, a 2D model, a 2D sketch, and/or a 2D image of the input part. Such models, sketches, and/or images thus may be referred to as input models, input sketches, and/or input images, respectively. Receiving 12 may include receiving a part signature, a shape metric, a physical property, and/or a physical metric corresponding to attributes to the input part. Receiving 12 may include receiving, constructing, and/or identifying the input 3D model in/from the input. Receiving 12 may include receiving auxiliary information relating to the input representation, the search query, and/or the input part. Receiving 12 may include receiving an input machining feature descriptor. The input machining feature descriptor may include a machining feature of the input part (an input machining feature), a 3D model of the input machining feature, a negative geometry model of the input machining feature, a surface of the input machining feature, a textual description of the input machining feature, a keyword description of the input machining feature, a 2D image of the input machining feature, a 2D sketch of the input machining feature, and/or a 3D sketch of the input machining feature.

Methods 10 may include converting 24 the input to a 3D model, and/or to a different 3D model. Converting 24 may include constructing and/or identifying the input 3D model from the input representation and/or the search query. Converting 24 may include converting the input 3D model (as received) from an input format into a converted format (e.g., a surface tessellation format). The input format may be a format of a 3D model as described, for example, a boundary representation, a CAD format, and/or a CAM format. The input 3D model in the converted format may be referred to as the converted 3D model. The converted format may facilitate associating 30 the input 3D model in the machining knowledge database, searching 16 for similar, stored 3D models in the machining knowledge database, and/or providing the input 3D model with the search result. The converted format may be a neutral format, e.g., a non-proprietary, open format. The converted format may be common with one or more stored 3D models of the machining knowledge database. If methods 10 are repeated, methods 10 may include converting at least two, and optionally each, input into a single converted format. Additionally or alternatively, repeated methods 10 may include not converting every input into the converted format, for example, converting an input of a first repeat into a first converted format and converting an input of a second repeat into a second converted format (or not converting the input of the second repeat). The converted format may be (optionally independently for each repeat) a solid model, a 3D polygonal mesh (e.g., a surface tessellation format and/or a STL file), a 3D wireframe, 3D surface descriptions, a 3D solid, a 3D topology (boundary representation), a CAD format, and/or a CAM format. Further, methods 10 may include providing the converted 3D model to the user, for example, displaying the converted 3D model and/or visualizing the converted 3D model. The converted 3D model may be displayed and/or visualized responsive to user inputs. Methods 10 may include adjusting a view of the converted 3D model (e.g., responsive to user inputs) and/or measuring the converted 3D model (with or without further user inputs).

Methods 10 may include identifying 26 machining features of the input (e.g., the input representation, the search query, and/or the input 3D model as received and/or as converted). The machining features may be identified by analyzing the input, e.g., in the manner described to identify machining features in 3D models and/or corresponding machining code of the machining knowledge database. For example, machining features may be determined by decomposing the input 3D model into machining features based upon surfaces, surface arrangements, primitive shapes, negative geometries, and/or positive geometries, as described herein. Additionally or alternatively, machining features may be identified based upon the input, e.g., identifying the machining feature that includes a surface (of the input 3D model) specified in the input. For example, the user may select the surface to identify a machining feature of interest.

Methods 10 include determining 14 the part signature of the input part (the input part signature). The input part signature includes a shape metric corresponding to geometric attributes of the input, may include a physical metric corresponding to physical attributes of the input part, and may include one or more physical properties of the input part. Determining 14 may include determining, receiving, and/or identifying the shape metric, the physical metric, and/or one or more physical properties of the input part.

The input part signature of the input part is comparable to the stored part signatures of the machining knowledge database. More specifically, at least one aspect, element, and/or metric of the input part signature is comparable to a corresponding aspect, element, and/or metric of the stored part signatures. For example, the input part signature, the shape metric, and/or the physical properties of the input part may be determined and/or encoded in the same manner as the corresponding element of the stored part signatures of the machining knowledge database.

Methods 10 may include associating 30 the input and the input part signature in the machining knowledge database. Associating 30 the input may include storing, referencing, and/or associating one or more portions, elements, and/or components of the input, or the entirety of the input, in the machining knowledge database, for example, storing the input 3D model (as received and/or as converted). Associating 30 may include associating one or more physical properties relating to the input part with the input representation, the search query, the input 3D model, and/or the input part signature in the machining knowledge database. Associating 30 may include associating auxiliary information (as described with respect to the machining knowledge database) relating to the input part with the input representation, the search query, the input 3D model, and/or the input part signature in the machining knowledge database. Associating 30 may include associating at least one, and optionally each, of the input machining features, if any are received and/or identified, with the input representation, the search query, the input 3D model, and/or the input part signature in the machining knowledge database. Associating 30 may include associating one or more of the search results with the input representation, the search query, the input 3D model, and/or the input part signature in the machining knowledge database.

Methods 10 include searching 16 the machining knowledge database for one or more stored 3D models of formed parts that are similar to the input part, based at least in part on the input and the input part signature. Searching 16 may be referred to as shape-based searching, because the input part signature includes the shape metric corresponding to geometric attributes of the input part.

Searching 16 may include searching the machining knowledge database for one or more stored 3D models that are associated with and/or correspond to a stored physical property that is similar to at least one of the physical properties of the input part. Searching 16 may include searching the machining knowledge database for one or more stored 3D models that are associated with and/or correspond to stored auxiliary information that is similar to at least one piece of auxiliary information relating to the input part. Searching 16 may include searching the machining knowledge database for one or more stored 3D models that include at least one machining feature that is similar to at least one machining feature of the input part.

Searching 16 may include comparing at least a portion of the input part signature with the corresponding portion of the stored part signatures of at least one, optionally each, stored 3D model of the machining knowledge database. The comparing may include determining a similarity score (a measure of model similarity) between at least a portion of the input part signature and the corresponding portion of the stored part signature. The result of comparing and/or the similarity score may include, for example, a Euclidean distance between the compared part signatures and/or a correlation between the compared part signatures.

Searching 16 may be responsive to receiving 12, determining 14, converting 24, identifying 26, and/or associating 30. Searching 16 may be responsive to receiving a search criterion from the user and/or the user requesting a search of the machining knowledge database. For example, methods 10 may include receiving one or more search criteria from the user (the search criteria including a geometric attribute, a physical property, and/or auxiliary information related to the input part), and, based at least in part on the search criteria, searching 16 and/or repeating the searching 16. Methods 10 may include refining 34 the search, e.g., by receiving a refined search criterion from the user (e.g., the user may request a refined search) and repeating the searching 16, the generating 18, and the providing 20 based at least in part on the refined search criterion. For example, refining 34 may include performing an updated search based on the refined search criterion (and the input and/or the search result), generating an updated search result that includes one or more stored 3D models similar to the input part based upon the refined search criterion, and providing the updated search result to the user.

Methods of querying and searching a 3D model database and shape metrics are further described in Funkhouser et al., "A Search Engine for 3D Models," *ACM Trans. Graphics*, 22:1, 83-105 (2003), the entire disclosure of which is incorporated by reference for all purposes.

Methods 10 include generating 18 a search result that includes one or more of the stored 3D models of the machining knowledge database that are similar to the input part. The search result may include stored 3D models similar to the input part, stored 3D models including machining features similar to those of the input part, and/or machining features similar to machining features of the input part. Generating 18 may include accessing and/or evaluating data associated with and/or related to the stored 3D models of the search result. For example, the data may include, and/or may be, the stored part signatures, physical properties, auxiliary information, machining features, and/or machining code.

Generating 18 may include ranking and filtering, i.e., the search result may be ranked and filtered. Ranking and filtering may be based at least in part upon a similarity score, a relevancy score (a measure of likely value of the result), and/or search criteria (such as the input). The relevance score may be influenced by prior search results, date of production of the part corresponding to the stored 3D model, and/or correspondence with search criteria. Ranking and filtering may include at least one of ordering the search result (and/or a subset of the search result) and selecting similar stored 3D models to include in the search result.

Methods 10 include providing 20 the search result to the user, e.g., the user may receive the search result. Providing 20 may include providing the input (e.g., the input representation, the search query, and/or the input 3D model, as received and/or as converted) to the user. Providing 20 may include presenting and/or visualizing the input and one or more of the stored 3D models of the search result (e.g., visually comparing the input and one or more of the stored 3D models). Visualizing includes rendering and/or displaying a visual representation of the 3D models. Providing 20 may include presenting and/or visualizing one or more difference between the input and at least one, optionally each, stored 3D model of the search result. Further, providing 20 may include presenting and/or visualizing one or more surfaces and/or machining features of the input and/or the search result. The user may compare the stored 3D models of the search result and/or the input, for example by reviewing the similarities and/or differences between the 3D models (and/or the input), by determining a quantity relating to the similarities and/or differences (e.g., a similarity score, a shared volume, a volume added, a volume removed, etc.).

The presenting and/or visualizing may be responsive to user inputs. For example, providing 20 may include performing, responsive to user inputs, adjusting the view (e.g., zooming, panning, rotating, cross-sectioning, etc.) of a selected 3D model (of the search result or the input) and/or measuring the selected 3D model.

Providing 20 may include displaying the input and one or more of the 3D models simultaneously and/or adjacent to each other. Where the input includes the input 3D model, one or more of the stored 3D models and the input 3D model may be displayed in an overlaid fashion, or format, e.g., with the models aligned to a common coordinate origin, aligned in a common orientation, and/or normalized to a relative scale. Overlaid models may each independently be displayed as semi-transparent and the (relative and/or absolute) transparency may be adjusted in response to user inputs (i.e., the transparency is user-selectable).

Methods 10 may include guiding 40 the user through a cost estimation process. Methods 10 may include providing the user with a cost estimate (e.g., a quote) before, during, and/or after the guiding 40. For example, methods 10 may include providing a preliminary quote based on the search result and may include providing a completed quote based on user input in the cost estimation process guided by the guiding 40. Cost estimates for producing the input part may be determined at least in part by aggregate quantities, for example, an average production cost and/or time of a group of stored 3D models of the search result, the total production cost and/or time of a group of machining features of the search result (e.g., machining features that represent the machining features of the input part), and/or an average production cost and/or time of a group of machining features of the search result (e.g., a group of similar machining features that represent one or more machining features of the input part).

Guiding 40 may include prompting the user to input physical properties of the input part, a stock piece property, a machining operation parameter, an NRE parameter, a part quantity, and/or a part delivery parameter. Stock piece properties may include, and/or may be, a stock piece model, a stock piece size, a stock piece mass, a stock piece density, a stock piece cost, and/or a stock piece cost per mass. Machining operation parameters may include, and/or may be, a machine type, a forming type (e.g., subtractive manufacturing, milling, drilling, turning, additive manufacturing, molding, casting, stamping, folding, coating, and/or assembling), a setup cost, a setup time, a setup cost rate, a machining cost, a machining time, a machining cost rate, and/or a number of operations. NRE parameters may include, and/or may be, fixturing parameters (e.g., hardware type, hardware cost, fixture production time, fixture production cost, fixture production cost rate, fixture setup time, fixture setup cost, and/or fixture setup cost rate), CAM programming parameters (e.g., CAM programming time, CAM programming cost, and/or CAM programming cost rate), and inspection parameters (e.g., inspection time, inspection cost, and/or inspection cost rate).

Methods 10 may include associating 44 the cost estimate, or cost estimates, with the input in the machining knowledge database.

Methods 10 may include accessing 42 information related to the search result, e.g., machining code and/or auxiliary information corresponding to one or more stored 3D models of the search result. Additionally or alternatively, the user may access information related to the search result. Accessing 42 may include providing and/or retrieving one or more physical properties and/or auxiliary information relating to a selected 3D model (of the search result or the input) and/or to one or more machining features of the selected 3D model. Accessing 42 may include determining, retrieving, and/or providing one or more aggregate quantities describing the search result and/or a subset of the search result. For example, the average, the weighted average, and/or the total of a numerical parameter (e.g., the production cost, the production time, and/or the number and types of results) may be determined, retrieved, and/or provided. As another example, the total production cost and/or total production time of a group of machining features (of the selected 3D model and/or the stored 3D models) may be determined, retrieved, and/or provided.

Accessing 42 may include providing and/or retrieving machining code related to one or more of the stored 3D models of the search result and/or one or more machining features of the search result. Additionally or alternatively, the user may access machining code related to one or more of the stored 3D models of the search result and/or one or more machining features of the search result. The machining code may be provided by storing a machining code file (that includes the machining code) in a user-defined location, providing a link to a machining code file, displaying the machining code, and/or simulating the machining code. Simulating the machining code may include visualizing electronic models of toolpaths and/or workpieces corresponding to the machining code.

Providing and/or retrieving machining code may be in conjunction with providing 20 the search result (e.g., prompted by providing 20), providing information relating to the search result, and/or may be responsive to user inputs. For example, methods 10 may include receiving, from the user, a selected 3D model (and/or a selected machining feature) from the search result and accessing 42 may include providing machining code related to (e.g., associated with) the selected 3D model. Machining features may be selected by identifying a surface of the selected 3D model. As yet another example, the user may review the machining code associated with one or more of the stored 3D models of the search result, and may interpret, edit, and/or simulate the machining code.

The user may determine a machining strategy for the input 3D model, and/or may produce machining code for the input 3D model, based at least in part on the machining strategy, machining operations, and/or toolpaths described by the machining code of the search result. The user may fabricate 46 the input part based at least in part on the search result, e.g., the machining features related to the search result, the machining code related to the search result, and/or the machining strategy related to the search result.

Methods 10 may include creating a task relating to the input part and associating the task with the input in the machining knowledge database. The task may include an owner and a milestone date (e.g., a due date). The task may include quoting, programming, fabricating, and delivering the input part. The task and/or the creating the task may be part of a project management system.

FIG. 2 shows an example of a search system 60 for searching and/or querying a machining knowledge database 72 according to the present disclosure. For example, search system 60 may be configured to perform any of methods 10. Additionally or alternatively, methods 10 may be performed, at least in part, by using the search system 60. The search system 60 may include the machining knowledge database 72 and several modules 64 that interact with each other and with the machining knowledge database 72. Generally, modules 64 and the machining knowledge database 72 are control logic (e.g., instructions) and/or data stored in the search system 60. Modules 64 may include an input module 70, a search engine 74, a results explorer 76, a pre-processing module 80, a code explorer 82, and/or a cost guide module 84. The search system 60 may include user interface elements and/or may be configured for server operations.

The input module 70 is configured to receive, from a user, user input 62 relating to the input part. User input 62 may be in the form of an input representation of the input part (such as an input 3D model) and/or in the form of a search query that describes the input part. The input module 70 may be configured to interact with the user and may be configured to communicate the result of the user input 62 to other modules 64, such as the search engine 74 and the pre-processing module 80. The input module 70 may be configured to perform at least a portion of one or more of the steps of receiving 12 the input, converting 24 the input, identifying 26 machining features of the input, determining 14 the input part signature, and/or associating 30 the input and the input part signature in the machining knowledge database 72, as described with respect to FIG. 1. For example, the input module 70 may be configured to receive and/or determine the input part signature.

The search engine 74 is configured to receive the input representation, the search query, and/or the input 3D model corresponding to the input part, and to search the machining knowledge database 72 for one or more stored 3D models of formed parts that are similar to the input part. The search engine 74 is configured to search based at least in part on the input part signature. The search engine is configured to generate a search result that includes one or more of the stored 3D models that are similar to the input part. The search engine 74 may be configured to interact with (e.g., to receive input from and/or to provide output to) the input module 70, the pre-processing module 80, the machining knowledge database 72, the results explorer 76, the code explorer 82, and/or the cost guide module 84. The search engine 74 may be configured to perform at least a portion of one or more of the steps of determining 14 the input part signature, searching 16 the machining knowledge database 72, and/or generating 18 the search result, as described with respect to FIG. 1.

The results explorer 76 is configured to provide (e.g., to display, to visualize, to transfer, and/or to transmit) the search result, generated by the search engine 74, to the user as user output 66. The results explorer 76 may be configured to provide (e.g., to display, to visualize, to transfer, and/or to transmit) a comparison among the search results and/or between at least a portion of the search results and at least one of the user input 62, the input representation, the search query, and/or the input 3D model. The results explorer 76 may be configured to interact with the user and may be configured to communicate the result of user interaction to other modules 64, such as the search engine 74, the code explorer 82, and/or the cost guide module 84. For example, the results explorer 76 may be configured to refine and/or to change the search criteria that generated the original search result and to prompt a new search by the search engine 74 based upon the refined and/or changed search criteria. The results explorer 76 may provide new search results in addition to and/or in alternative to the original search results. The results explorer 76 may be configured to interact with the machining knowledge database 72, the search engine 74, the code explorer 82, and/or the cost guide module 84. The results explorer 76 may be configured to perform at least a portion of one or more of the steps of providing 20 the search result, refining 34 the search, and/or accessing 42 information related to the search result, as described with respect to FIG. 1.

The optional pre-processing module 80 is configured to receive the input representation, the search query, and/or a 3D model related to the search query and/or the search result. The pre-processing module 80 is configured to adjust, to augment, and/or to replace all or a portion of the module input. For example, the pre-processing module 80 may be configured to determine the input part signature based on the input representation and/or the search query. As another example, the pre-processing module 80 may be configured to construct and/or to identify the input 3D model from the input representation and/or the search query. As yet another example, the pre-processing module 80 may be configured to convert the input 3D model from an input format (e.g., a boundary representation) into a converted format (e.g., a surface tessellation format). The converted format may facilitate associating the input 3D model in the machining knowledge database 72, searching for similar, stored 3D models in the machining knowledge database 72, and/or visualizing the input 3D model. As a further example, the pre-processing module 80 may be configured to identify and/or to extract machining features of the input 3D model. The pre-processing module 80 may be configured to interact with the input module 70, the machining knowledge database 72, and/or the search engine 74. The pre-processing module 80 may be configured to perform at least a portion of one or more of the steps of converting 24 the input, identifying 26 machining features, determining 14 the input part signature, and/or associating 30 the input and the input part signature in the machining knowledge database 72, as described with respect to FIG. 1.

The optional code explorer 82 is configured to provide (e.g., to display, to visualize, to transfer, and/or to transmit) machining code associated with the stored 3D models of the search result. For example, the code explorer 82 may be configured to display a textual representation of the machining code and/or to visualize the results of performing the machining code (e.g., simulating the machining code). The code explorer 82 may be configured to perform and/or to provide toolpath verification and/or forming machine simulation. The code explorer 82 may be configured to interact with the user and may be configured to communicate the result of user interaction to other modules 64, such as the search engine 74, the results explorer 76, and/or the cost guide module 84. For example, the code explorer 82 may be configured to modify (based on input from other modules 64), and/or to allow the user to modify, the machining code. As another example, the code explorer 82 may be configured to refine and/or to change the search criteria that generated the original search result and to prompt a new search by the search engine 74 based upon the refined and/or changed search criteria. The code explorer 82 may provide machining code associated with the new search results. The code explorer 82 may be configured to interact with the machining knowledge database 72, the search engine 74, the results explorer 76, and/or the cost guide module 84. The code explorer 82 may be configured to perform at least a portion of one or more of the steps of providing 20 the search result, refining 34 the search, and/or accessing 42 information related to the search result, as described with respect to FIG. 1.

The optional cost guide module 84 is configured to guide the user through a cost estimation process and/or to provide the user a completed quote (e.g., after the cost estimation process). The cost guide module 84 may be configured to interact with the user and may be configured to communicate the result of user interaction to other modules 64, such as the search engine 74, the results explorer 76, and/or the code explorer 82. For example, the cost guide module 84 may be configured to provide and/or to estimate cost parameters based on input from other modules 64 and/or data from the machining knowledge database 72. The cost guide module 84 may be configured to prompt a new search and/or a refined search (e.g., by refining and/or changing the search criteria). The cost guide module 84 may be configured to provide and/or to estimate cost parameters based on the search result and/or an updated search result. The cost guide module 84 may be configured to interact with the machining knowledge database 72, the search engine 74, the results explorer 76, and/or the code explorer 82. The cost guide module 84 may be configured to perform at least a portion of one or more of the steps of providing 20 the search result, refining 34 the search, guiding 40 the user through the cost estimation process, accessing 42 information related to the search result, and/or associating 44 the cost estimate with the input in the machining knowledge database 72, as described with respect to FIG. 1.

The search system 60 may include a controller 68 programmed to control the various modules 64. For example, the controller 68 may operate (a) the input module 70 to receive a search query that describes an input 3D model, (b) the search engine 74 to search the machining knowledge database 72 and to generate a search result that includes one or more similar 3D models, (c) the results explorer 76 to visualize at least a subset of the search result, and/or (d) the code explorer 82 to display machining code associated with at least one of the similar 3D models. The controller 68 may automate one or more modules 64 and/or may activate, deactivate, execute, and/or terminate one or more processes associated with one or more modules 64, e.g., based upon user input 62, user output 66, and/or the operation of one or more modules 64.

The search system 60 may include one or more background processes, e.g., a crawler and/or a daemon. For example, one or more of the controller 68 and the modules 64 may include, and/or may be, a background process. As a specific example, the input module 70 and/or the pre-processing module 80 may search and/or monitor a file system and/or a file repository (such as an intranet, a network, and/or the internet) for new 3D models (i.e., not stored in the machining knowledge database 72) and new related machining code and/or auxiliary information. In response to recognizing a new 3D model and/or new data, the background process may prompt the action of other modules 64 and/or the controller 68 (e.g., to associate the new 3D model and/or new data in the machining knowledge database 72).

Where data, data files, parameters, variables, constants and the like are referenced as being transferred to, sent to, passed to, received from, and/or returned from two or more components of search system 60, the corresponding data, data files, parameters, variables, constants, etc. may be electronically transferred, in whole or in part, as copies, references, links, and/or pointers, and may be electronically transferred directly or indirectly (via intermediary processes).

Figure 3:
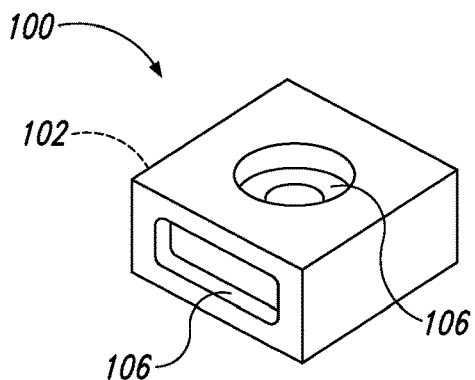
FIG. 3 is a perspective representation of an example of a part.

FIGS. 3-6 illustrate a specific, albeit simplified, example of performing methods 10 and/or using the search system 60 according to the present disclosure. FIG. 3 is a representation of an input part 100. The input part 100 generally is a part to be fabricated and includes one or more machining features 106. In the example of FIG. 3, the top machining feature 106 is a counterbored hole, and the front machining feature 106 is a pocket. The input part 100 may be represented by an input 3D model 102. The input 3D model 102 may be created as discussed herein. For example, the user may design the input 3D model 102 with a CAD tool or other design authoring system.

Figure 4:
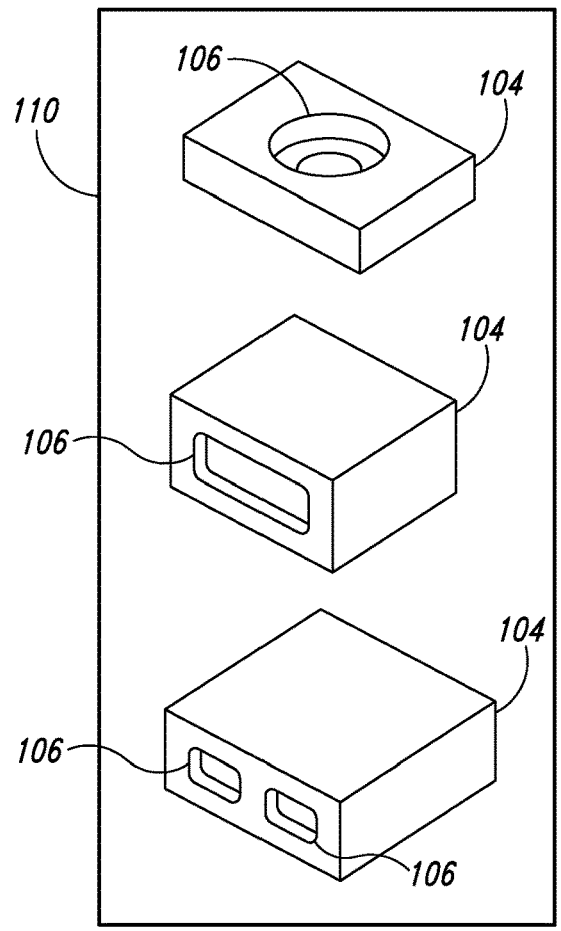
FIG. 4 is an example of search results relating to the part of FIG. 3.

The user may prompt a search, e.g., by providing a search query including the input 3D model 102, and the search system may search the machining knowledge database to generate a search result 110, as represented in FIG. 4. The search result 110 includes one or more stored 3D models 104 that are similar to the input part 100. In the example of FIG. 4, the top stored 3D model 104 has a machining feature 106 that is a counterbored hole, but no front pocket. The middle stored 3D model 104 has a machining feature 106 that is a pocket, but no top counterbored hole. The bottom stored 3D model 104 has two front machining features 106 that are pockets, but no top counterbored hole. Attributes of the search results such as physical properties, auxiliary information, machining code, and/or aggregate information may be displayed with the search result 110 and/or may be displayed in response to the user selecting a stored 3D model 104 of the search result 110.

Figure 5:
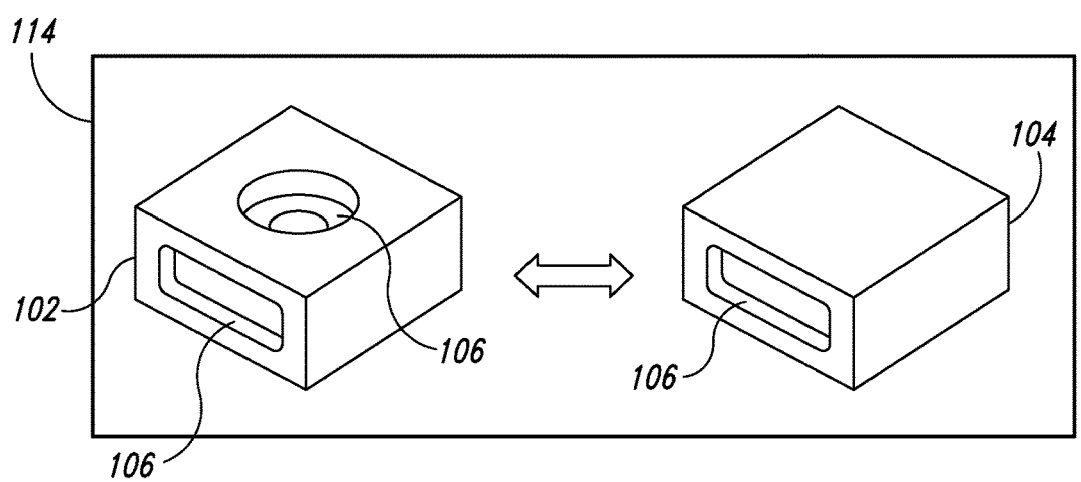
FIG. 5 represents a visual comparison of a 3D model and a selected search result.

The user may select one or more stored 3D models 104 of the search result 110 (and/or machining features 106 of the search result 110) to investigate further and/or to compare with the input part 100 (e.g., the input 3D model 102). FIG. 5 represents a visual comparison 114 of the input 3D model 102 and a selected 3D model of the stored 3D models 104 of the search result 110 (also referred to as a selected search result). In the example of FIGS. 3-5, the selected search result for the visual comparison 114 is the middle stored 3D model 104 of the search result 110. The input 3D model 102 and the selected search result may be visualized side-by-side and/or may be visualized as semi-transparent overlays. The user may select the relative transparency of the input 3D model and the selected search result, as indicated by the double-headed arrow in FIG. 5. By adjusting the relative transparency, the user may adjust which 3D model is dominantly visible and may be able to emphasize differences between the 3D models.

Figure 6:
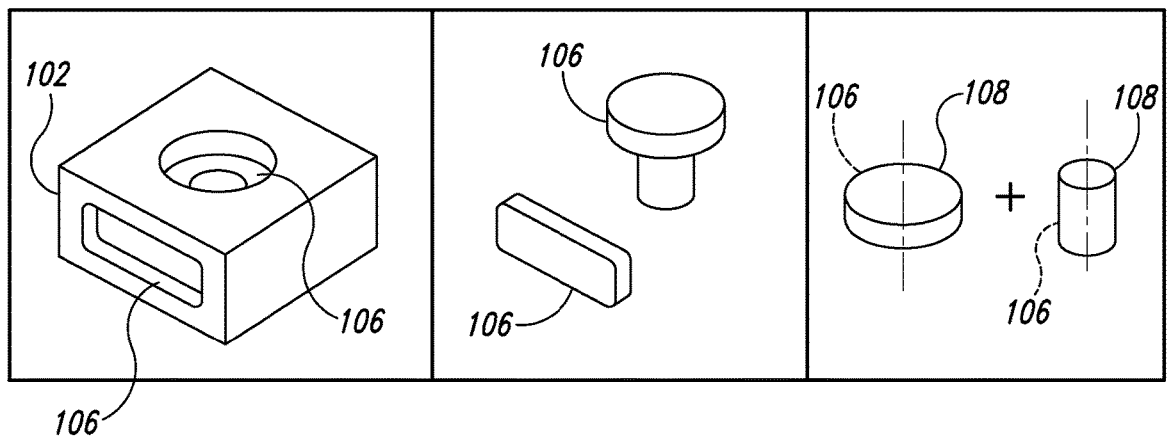
FIG. 6 represents identifying machining features of a 3D model.

FIG. 6 represents an example of identifying machining features 106 of a 3D model. Though the 3D model in the example of FIG. 6 is the input 3D model 102, identifying may be performed with the input 3D model 102, a stored 3D model, or other 3D models as discussed herein. In the example of FIG. 6, the input 3D model 102 includes two machining features 106, namely, a top counterbored hole and a front pocket. The center panel of FIG. 6 represents the machining features 106 as the corresponding negative geometry (i.e., the amount of material that would be removed from a close-fitting stock piece to produce the respective machining features 106). Machining features 106 may be further decomposed into one or more sub-features or shape primitives 108, as shown in the right panel of FIG. 6. In this example, the shape primitives 108 are a wide flat cylinder and a narrow, tall cylinder. The shape primitives 108 each may be a machining feature 106.

Figure 7:
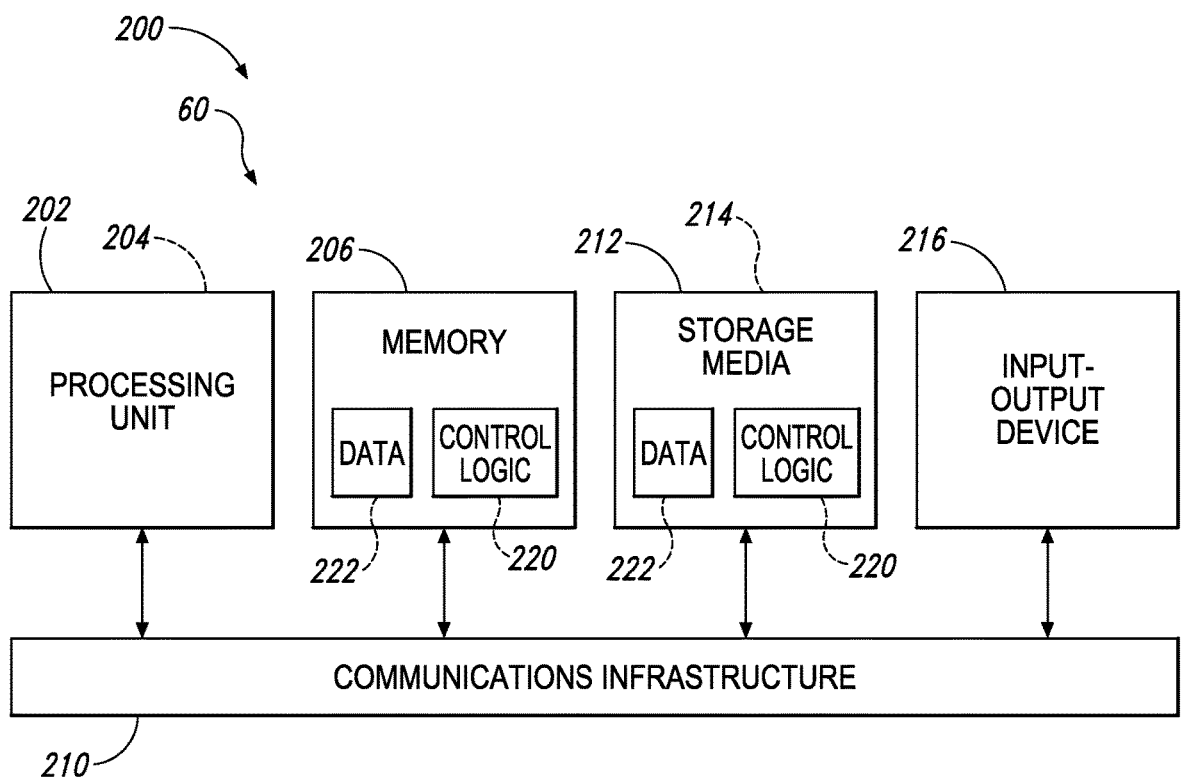
FIG. 7 is a schematic representation of a computerized system according to the present disclosure.

FIG. 7 schematically depicts a computerized system 200 that may be used to implement and/or instantiate search systems 60 and components thereof, such as modules 64 and the machining knowledge database 72. The computerized system 200 includes a processing unit 202 operatively coupled to a computer-readable memory 206 by a communications infrastructure 210. The processing unit 202 may include one or more computer processors 204 and may include a distributed group of computer processors 204. The computerized system 200 also may include a computer-readable storage media assemblage 212 that is operatively coupled to the processing unit 202 and/or the computer-readable memory 206, e.g., by communications infrastructure 210. The computer-readable storage media assemblage 212 may include one or more non-transitory computer-readable storage media 214 and may include a distributed group of non-transitory computer-readable storage media 214.

The communications infrastructure 210 may include a local data bus, a communication interface, and/or a network interface. The communications infrastructure may be configured to transmit and/or to receive signals, such as electrical, electromagnetic, optical, and/or acoustic signals.

The computerized system 200 may include one or more input-output devices 216 operatively coupled to the processing unit 202, the computer-readable memory 206, and/or the computer-readable storage media assemblage 212. Examples of input-output devices 216 include monitors, keyboards, pointing devices (e.g., mice), touch screens, etc.

The computerized system 200 may include a distributed group of computers, servers, workstations, etc., which each may be interconnected directly or indirectly (including by network connection). Thus, the computerized system 200 may include one or more processing units 202, computer-readable memories 206, computer-readable storage media assemblages 212, and/or input-output devices 216 that are located remotely from one another.

One or both of the computer-readable memory 206 and the computer-readable storage media assemblage 212 include control logic 220 and/or data 222. Control logic 220 (which may also be referred to as software, firmware, and/or hardware) may include instructions that, when executed by the processing unit 202, cause the computerized system 200 to perform one or more of the methods described herein. Control logic 220 may include one or more of the modules 64. Data 222 may include the machining knowledge database 72 and/or data associated with the methods 10 (e.g., input 3D model 102, stored 3D model 104) and/or one or more of the modules 64.

Examples of inventive subject matter according to the present disclosure are described in the following enumerated paragraphs.

A1. A computerized method for searching a machining knowledge database, comprising:

receiving, from a user, an input representation of an input part;

determining an input part signature that includes a shape metric corresponding to geometric attributes of the input part;

associating the input representation with the input part signature in a machining knowledge database;

searching the machining knowledge database for one or more stored 3D models of formed parts similar to the input part, wherein the searching is based at least in part on the input part signature, wherein the machining knowledge database includes stored 3D models associated with respective stored part signatures, wherein the stored part signatures correspond to geometric attributes of the respective stored 3D models;

generating a search result that includes one or more of the stored 3D models of the machining knowledge database that are similar to the input part; and providing the search result to the user.

A2. The method of paragraph A1, further comprising receiving one or more physical properties relating to the input part, wherein the searching includes searching based at least in part on the one or more physical properties, and optionally wherein the one or more physical properties include at least one of a material type, an input part bounding box, an input part volume, an input part volume removed, an input part volume added, an input part mass, an input part density, an input part surface area, an input part surface finish, an input part surface treatment, and an input part surface coating.

A3. The method of any of paragraphs A1-A2, further comprising receiving auxiliary information relating to at least one of the input representation and the input part, and wherein the searching includes searching based at least in part on the auxiliary information.

A3.1. The method of paragraph A3, wherein the auxiliary information includes at least one physical property relating to the input part, a machine type, a tool type, a stock piece model, and a stock piece size.

A3.2. The method of any of paragraphs A3-A3.1, wherein the auxiliary information includes a forming type, and optionally wherein the forming type is at least one of subtractive manufacturing, milling, drilling, turning, additive manufacturing, molding, casting, stamping, folding, coating, and assembling.

A4. The method of any of paragraphs A1-A3.2, further comprising receiving an input machining feature descriptor that includes at least one of an input machining feature, a 3D model of the input machining feature, a negative geometry model of the input machining feature, a surface of the input machining feature, a textual description of the input machining feature, a keyword description of the input machining feature, a 2D image of the input machining feature, a 2D sketch of the input machining feature, and a 3D sketch of the input machining feature, and wherein the searching includes searching based at least in part on the input machining feature descriptor.

A4.1. The method of paragraph A4, wherein the input machining feature descriptor includes at least one input machining feature, and wherein the method further comprises associating at least one, and optionally each, of the input machining features with the input representation in the machining knowledge database, optionally wherein at least one of the input machining features includes, and optionally is, a 3D model and/or a negative geometry model.

A5. The method of any of paragraphs A1-A4.1, further comprising identifying one or more input machining features of the input part and/or in the input representation, and wherein the searching includes searching based at least in part on the one or more input machining features.

A5.1. The method of paragraph A5, wherein the identifying includes computing a stock volumetric difference between a/the stock piece model for the input part and a/the 3D model of the input part, optionally wherein the identifying includes identifying discontinuous volumes of the stock volumetric difference as separate machining features.

A5.2. The method of any of paragraphs A5-A5.1, wherein the identifying includes computing a box volumetric difference between a bounding box of a/the 3D model of the input part and the 3D model of the input part, optionally wherein the identifying includes identifying discontinuous volumes of the box volumetric difference as separate machining features.

A5.3. The method of any of paragraphs A5-A5.2, wherein the identifying includes computing a negative geometry of a/the 3D model of the input part, optionally wherein the identifying includes identifying discontinuous volumes of the negative geometry as separate machining features.

A5.4. The method of any of paragraphs A5-A5.3, wherein the identifying includes analyzing discontinuous volumes, wherein the analyzing includes decomposing each volume into a set of primitive shapes, and wherein the identifying includes identifying each primitive shape as one of the input machining features, optionally wherein the set of primitive shapes includes at least one of a geon, a plane, a pocket, a hole, and a contour.

A5.5. The method of any of paragraphs A5-A5.4, further comprising associating at least one, and optionally each, of the input machining features with the input representation in the machining knowledge database, optionally wherein at least one of the input machining features includes, and optionally is, a 3D model and/or a negative geometry model.

A6. The method of any of paragraphs A1-A5.5, wherein the input representation includes an input 3D model, wherein the method comprises converting the input 3D model to a converted 3D model in a converted format.

A6.1. The method of paragraph A6, wherein the converted format is a neutral format and/or a surface tessellation format.

A6.2. The method of any of paragraphs A6-A6.1, further comprising repeating the method with a second input representation that includes a second 3D model, and wherein the method includes converting the second 3D model to a second converted 3D model in the converted format.

A6.3. The method of any of paragraphs A6-A6.2, wherein the input 3D model is a CAD model and wherein the converted format is a CAM format.

A6.4. The method of any of paragraphs A6-A6.3, further comprising providing the converted 3D model to the user.

A6.4.1. The method of paragraph A6.4, wherein the providing the converted 3D model includes displaying the 3D model to the user.

A6.4.2. The method of any of paragraphs A6.4-A6.4.1, wherein the providing the converted 3D model includes performing, responsive to user inputs, at least one of visualizing the converted 3D model, adjusting a view of the converted 3D model, and measuring the converted 3D model.

A7. The method of any of paragraphs A1-A6.4.2, wherein the determining the input part signature includes determining the shape metric.

A8. The method of any of paragraphs A1-A7, wherein the geometric attributes include global and local attributes.

A9. The method of any of paragraphs A1-A8, wherein the shape metric describes and/or corresponds to an input machining feature of the input part.

A10. The method of any of paragraphs A1-A9, wherein the input part signature includes (the) one or more physical properties of the input part.

A11. The method of any of paragraphs A1-A10, wherein the input part signature includes a physical metric that corresponds to (the) one or more physical properties of the input part.

A11.1. The method of paragraph A11, wherein the determining the input part signature includes determining the physical metric.

A12. The method of any of paragraphs A1-A11.1, further comprising associating (the) one or more physical properties relating to the input part with the input representation in the machining knowledge database.

A13. The method of any of paragraphs A1-A12, further comprising associating (the) auxiliary information, relating to at least one of the input representation and the input part, with the input representation in the machining knowledge database.

A14. The method of any of paragraphs A1-A13, wherein the searching includes searching based at least in part on the input representation.

A15. The method of any of paragraphs A1-A14, wherein the searching includes searching the machining knowledge database for one or more stored 3D models that are associated with a stored physical property that is similar to at least one physical property of the input part.

A16. The method of any of paragraphs A1-A15, wherein the searching includes searching the machining knowledge database for one or more stored 3D models that are associated with stored auxiliary information that is similar to at least one piece of (the) auxiliary information of the input part.

A17. The method of any of paragraphs A1-A16, wherein the searching includes searching the machining knowledge database for one or more stored 3D models that include at least one machining feature that is similar to at least one machining feature of the input part.

A18. The method of any of paragraphs A1-A17, wherein the search result includes one or more of the stored 3D models of the machining knowledge database that have at least one machining feature that is similar to at least one machining feature of the input part.

A19. The method of any of paragraphs A1-A18, wherein the searching includes comparing the input part signature with the stored part signatures associated with at least one, and optionally each, stored 3D model of the machining knowledge database.

A19.1. The method of paragraph A19, wherein the comparing includes determining a similarity score for each stored 3D model compared, optionally wherein the similarity score is at least one of a Euclidean distance between the input part signature and the respective stored part signature, and a correlation between the input part signature and the respective stored part signature.

A20. The method of any of paragraphs A1-A19.1, wherein the searching is responsive to at least one of the receiving the input representation, the determining the input part signature, and the associating the input representation with the input part signature.

A21. The method of any of paragraphs A1-A20, wherein the searching is responsive to receiving a search criterion from the user.

A22. The method of any of paragraphs A1-A21, further comprising receiving one or more search criteria from the user, wherein the one or more search criteria includes at least one of a geometric attribute, a physical property, and auxiliary information related to the input part, and further comprising at least one of searching and repeating the searching, based at least in part on the search criteria.

A23. The method of any of paragraphs A1-A22, further comprising receiving, from the user, a refined search criterion, performing an updated search based on the refined search criterion and at least one of the input representation and the search result, generating an updated search result that includes one or more stored 3D models similar to the input part based upon the refined search criterion, and providing the updated search result to the user.

A24. The method of any of paragraphs A1-A23, wherein the providing the search result to the user includes providing the input representation to the user.

A25. The method of any of paragraphs A1-A24, wherein the providing the search result to the user includes presenting and/or visualizing the input representation and one or more of the stored 3D models of the search result, and optionally wherein the presenting and/or visualizing is responsive to user inputs.

A25.1. The method of paragraph A25, wherein the input representation and one or more of the stored 3D models of the search result are displayed simultaneously and/or adjacent to each other.

A25.2. The method of any of paragraphs A25-A25.1, wherein the input representation and one or more of the stored 3D models of the search result are displayed in an overlaid format, optionally with user-selectable transparency.

A25.3. The method of any of paragraphs A25-A25.2, wherein the providing the search result to the user includes performing, responsive to user inputs, at least one of adjusting a view of a selected 3D model and measuring the selected 3D model, wherein the selected 3D model is one of the stored 3D models of the search result.

A26. The method of any of paragraphs A1-A25.3, wherein the providing the search result to the user includes presenting and/or visualizing one or more differences between the input representation and one or more of the stored 3D models of the search result.

A27. The method of any of paragraphs A1-A26, wherein the providing the search result to the user includes presenting and/or visualizing one or more machining features of the stored 3D models of the search result.

A28. The method of any of paragraphs A1-A27, wherein the providing the search result to the user includes presenting and/or visualizing one or more surfaces of the stored 3D models of the search result.

A29. The method of any of paragraphs A1-A28, further comprising providing a production summary corresponding to at least one of the stored 3D models of the search result and optionally wherein the production summary includes at least one of production cost, NRE (non-recurring engineering) cost, fabrication cost, production time, NRE time, fabrication time, and delivery time.

A30. The method of any of paragraphs A1-A29, further comprising guiding the user through a cost estimation process.

A30.1. The method of paragraph A30, further comprising providing the user a completed quote after the cost estimation process.

A30.2. The method of any of paragraphs A30-A30.1, wherein the guiding includes prompting the user to input at least one physical property relating to the input part, a stock piece property, a machining operation parameter, an NRE parameter, a part quantity, and a part delivery parameter.

A30.2.1. The method of paragraph A30.2, wherein stock piece properties include one or more of a stock piece model, a stock piece size, a stock piece mass, a stock piece density, a stock piece cost, and a stock piece cost per mass.

A30.2.2. The method of any of paragraphs A30.2-A30.2.1, wherein machining operation parameters include one or more of a machine type, a forming type, a setup cost, a setup time, a setup cost rate, a machining cost, a machining time, a machining cost rate, and a number of operations, and optionally wherein the forming type is at least one of subtractive manufacturing, milling, drilling, turning, additive manufacturing, molding, casting, stamping, folding, coating, and assembling.

A30.2.3. The method of any of paragraphs A30.2-A30.2.2, wherein the NRE parameters include one or more of fixturing parameters, CAM programming parameters, and inspection parameters; wherein the fixturing parameters include one or more of hardware type, hardware cost, fixture production time, fixture production cost, fixture production cost rate, fixture setup time, fixture setup cost, and fixture setup cost rate; wherein the CAM programming parameters include one or more of CAM programming time, CAM programming cost, and CAM programming cost rate; and wherein the inspection parameters include one or more of inspection time, inspection cost, and inspection cost rate.

A31. The method of any of paragraphs A1-A30.2.3, wherein one or more, and optionally substantially all or all, of the stored 3D models of the machining knowledge database correspond to respective formed parts.

A31.1. The method of paragraph A31, wherein the machining knowledge database includes machining code associated with the stored 3D models of the respective formed parts, and wherein the machining code was utilized to fabricate the respective formed parts.

A31.1.1. The method of paragraph A31.1, wherein the providing the search result to the user includes providing machining code associated with at least one of the stored 3D models of the search result.

A32. The method of any of paragraphs A1-A31.1.1, wherein the machining knowledge database associates one or more, and optionally substantially all or all, of the stored 3D models with one or more stored physical properties of a/the respective formed part, and optionally wherein the stored physical property includes at least one of a material type, a formed part bounding box, a formed part volume, a formed part volume removed, a formed part volume added, a formed part mass, a formed part density, a formed part surface area, a formed part surface finish, a formed part surface treatment, and a formed part surface coating.

A33. The method of any of paragraphs A1-A32, wherein the machining knowledge database associates one or more, and optionally substantially all or all, of the stored 3D models with stored auxiliary information relating to fabrication of a/the respective formed part.

A33.1. The method of paragraph A33, wherein the stored auxiliary information includes at least one of (the) one or more stored physical properties, a fabrication machine type, a fabrication tool type, a fabrication stock piece model, and a fabrication stock piece size.

A33.2. The method of any of paragraphs A33-A33.1, wherein the stored auxiliary information includes a fabrication forming type, and optionally wherein the fabrication forming type is at least one of subtractive manufacturing, milling, drilling, turning, additive manufacturing, molding, casting, stamping, folding, coating, and assembling.

A34. The method of any of paragraphs A1-A33.2, wherein the machining knowledge database associates one or more, and optionally substantially all or all, of the stored 3D models with one or more machining features of the respective stored 3D models.

A34.1. The method of paragraph A34, wherein at least one, optionally each, of the machining features in the machining knowledge database includes, optionally is, a stored 3D model in the machining knowledge database, optionally wherein the stored 3D model of the machining feature is a negative geometry model of the machining feature.

A34.2. The method of any of paragraphs A34-A34.1, wherein each of the machining features in the machining knowledge database is associated with machining feature code, and optionally wherein the machining feature code is a subset of a/the machining code associated with the respective stored 3D model.

A34.3. The method of any of paragraphs A34-A34.2, wherein each of the machining features in the machining knowledge database is associated with at least one of a production cost, a relative production cost, a production time, and a relative production time of the machining feature.

A35. The method of any of paragraphs A1-A34.3, further comprising creating a task relating to the input part and associating the task with the input representation in the machining knowledge database, wherein the task includes an owner and a milestone date.

A35.1. The method of paragraph A35, wherein the milestone date is a due date.

A35.2. The method of any of paragraphs A35-A35.1, wherein the task includes at least one of quoting, programming, fabricating, and delivering.

A36. The method of any of paragraphs A1-A35.2, wherein the input representation includes, optionally is, at least one of a 3D model, a 3D sketch, a 2D model, a 2D sketch, and a 2D image.

A37. The method of any of paragraphs A1-A36, wherein the shape metric corresponds to geometric attributes of the input representation.

A38. The method of any of paragraphs A1-A37, wherein the input part is a part to be fabricated.

A39. The method of any of paragraphs A1-A38, wherein the user is a person, a client device, and/or a client process.

A40. The method of any of paragraphs A31.1-A39, wherein the machining code is at least one of forming code, code for a forming machine, code for a 3D printer, code for a NC machine, and G-code.

A41. A computerized system for searching a machining knowledge database, the computerized system comprising:
  a computer-readable memory;
  a processing unit operatively coupled to the computer-readable memory; and
  a computer-readable storage media assemblage, wherein the storage media assemblage is operatively coupled to the computer-readable memory and includes instructions that, when executed by the processing unit, cause the computerized system to perform the method of any of paragraphs A1-A40.

B1. A computerized method for querying a machining knowledge database, the method comprising:
  receiving, from a user, a search query that describes an input part;
  determining an input part signature that includes a shape metric that corresponds to geometric attributes of the input part;
  searching a machining knowledge database for one or more stored 3D models of formed parts similar to the input part, wherein the searching is based at least in part on the input part signature, wherein the machining knowledge database includes stored 3D models associated with respective stored part signatures, wherein the stored part signatures correspond to geometric attributes of the respective stored 3D models;
  generating a search result that includes one or more of the stored 3D models of the machining knowledge database that are similar to the input part; and
  providing a visual comparison of the search query and the search result to the user.

B2. The method of paragraph B1, wherein the search query includes one or more physical properties relating to the input part, and optionally wherein the one or more physical properties include at least one of a material type, an input part bounding box, an input part volume, an input part volume removed, an input part volume added, an input part mass, an input part density, an input part surface area, an input part surface finish, an input part surface treatment, and an input part surface coating.

B3. The method of any of paragraphs B1-B2, wherein the search query includes auxiliary information relating to the input part.

B3.1. The method of paragraph B3, wherein the auxiliary information includes at least one physical property relating to the input part, a machine type, a tool type, a stock piece model, and a stock piece size.

B3.2. The method of any of paragraphs B3-B3.1, wherein the auxiliary information includes a forming type, and optionally wherein the forming type is at least one of subtractive manufacturing, milling, drilling, turning, additive manufacturing, molding, casting, stamping, folding, coating, and assembling.

B4. The method of any of paragraphs B1-B3.2, wherein the search query includes an input machining feature descriptor, wherein the searching is based at least in part on the machining feature descriptor, and wherein the machining feature descriptor includes at least one of an input machining feature, a 3D model of the input machining feature, a negative geometry model of the input machining feature, a surface of the input machining feature, a textual description of the input machining feature, a keyword description of the input machining feature, a 2D image of the input machining feature, a 2D sketch of the input machining feature, and a 3D sketch of the input machining feature.

B5. The method of any of paragraphs B1-B4, further comprising identifying one or more input machining features of the input part and wherein the searching includes searching based at least in part on the one or more input machining features.

B5.1. The method of paragraph B5, wherein the identifying includes computing a stock volumetric difference between a stock piece model for the input part and a 3D model of the input part, optionally wherein the identifying includes identifying discontinuous volumes of the stock volumetric difference as separate machining features.

B5.2. The method of any of paragraphs B5-B5.1, wherein the identifying includes computing a box volumetric difference between a bounding box of a/the 3D model of the input part and the 3D model of the input part, optionally wherein the identifying includes identifying discontinuous volumes of the box volumetric difference as separate machining features.

B5.3. The method of any of paragraphs B5-B5.2, wherein the identifying includes computing a negative geometry of a/the 3D model of the input part, optionally wherein the identifying includes identifying discontinuous volumes of the negative geometry as separate machining features.

B5.4. The method of any of paragraphs B5-B5.3, wherein the identifying includes analyzing discontinuous volumes, wherein the analyzing includes decomposing each volume into a set of primitive shapes, and wherein the identifying includes identifying each primitive shape as one of the input machining features, optionally wherein the set of primitive shapes includes at least one of a geon, a plane, a pocket, a hole, and a contour.

B6. The method of any of paragraphs B1-B5.4, wherein the determining the input part signature includes determining the shape metric.

B7. The method of any of paragraphs B1-B6, wherein the geometric attributes include global and local attributes.

B8. The method of any of paragraphs B1-B7, wherein the shape metric describes and/or corresponds to an input machining feature of the input part.

B9. The method of any of paragraphs B1-B8, wherein the input part signature includes (the) one or more physical properties of the input part.

B10. The method of any of paragraphs B1-B9, wherein the input part signature includes a physical metric that corresponds to (the) one or more physical properties of the input part.

B10.1. The method of paragraph B10, wherein the determining the input part signature includes determining the physical metric.

B11. The method of any of paragraphs B1-B10.1, wherein the searching includes searching based at least in part on the search query.

B12. The method of any of paragraphs B1-B11, wherein the searching includes searching the machining knowledge database for one or more stored 3D models that are associated with a stored physical property that is similar to at least one physical property of the input part.

B13. The method of any of paragraphs B1-B12, wherein the searching includes searching the machining knowledge database for one or more stored 3D models that are associated with stored auxiliary information that is similar to at least one piece of (the) auxiliary information of the input part.

B14. The method of any of paragraphs B1-B13, wherein the searching includes searching the machining knowledge database for one or more stored 3D models that include at least one machining feature that is similar to at least one machining feature of the input part.

B15. The method of any of paragraphs B1-B14, wherein the search result includes one or more of the stored 3D models of the machining knowledge database that have at least one machining feature that is similar to at least one machining feature of the input part.

B16. The method of any of paragraphs B1-B15, wherein the searching includes comparing the input part signature with the stored part signatures associated with at least one, and optionally each, stored 3D model of the machining knowledge database.

B16.1. The method of paragraph B16, wherein the comparing includes determining a similarity score for each stored 3D model compared, optionally wherein the similarity score is at least one of a Euclidean distance between the input part signature and the respective stored part signature, and a correlation between the input part signature and the respective stored part signature.

B17. The method of any of paragraphs B1-B16.1, wherein the searching is responsive to at least one of the receiving the search query and the determining the input part signature.

B18. The method of any of paragraphs B1-B17, further comprising receiving one or more search criteria from the user, wherein the one or more search criteria includes at least one of a geometric attribute, a physical property, and auxiliary information related to the input part, and further comprising at least one of searching and repeating the searching, based at least in part on the search criteria.

B19. The method of any of paragraphs B1-B18, further comprising receiving, from the user, a refined search criterion, performing an updated search based on the refined search criterion and the search result, generating an updated search result that includes one or more stored 3D models similar to the input part based upon the refined search criterion, and providing the updated search result to the user.

B20. The method of any of paragraphs B1-B19, wherein the providing the visual comparison includes presenting and/or visualizing at least a portion of the search query and one or more of the stored 3D models of the search result, and optionally wherein the presenting and/or visualizing is responsive to user inputs.

B20.1. The method of paragraph B20, wherein the portion of the search query and one or more of the stored 3D models of the search result are displayed simultaneously and/or adjacent to each other.

B20.2. The method of any of paragraphs B20-B20.1, wherein the portion of the search query includes an input 3D model and wherein the input 3D model and one or more of the stored 3D models of the search result are displayed in an overlaid format, optionally with user-selectable transparency.

B20.3. The method of any of paragraphs B20-B20.2, wherein the providing the visual comparison includes performing, responsive to user inputs, at least one of adjusting a view of a selected 3D model and measuring the selected 3D model, wherein the selected 3D model is one of the stored 3D models of the search result.

B21. The method of any of paragraphs B1-B20.3, wherein the providing the visual comparison includes presenting and/or visualizing one or more differences between the search query and one or more of the stored 3D models of the search result.

B22. The method of any of paragraphs B1-B21, wherein the providing the visual comparison includes presenting and/or visualizing one or more machining features of the stored 3D models of the search result.

B23. The method of any of paragraphs B1-B22, wherein the providing the visual comparison includes presenting and/or visualizing one or more surfaces of the stored 3D models of the search result.

B24. The method of any of paragraphs B1-B23, further comprising providing a production summary corresponding to at least one of the stored 3D models of the search result and optionally wherein the production summary includes at least one of production cost, NRE (non-recurring engineering) cost, fabrication cost, production time, NRE time, fabrication time, and delivery time.

B25. The method of any of paragraphs B1-B24, further comprising guiding the user through a cost estimation process for the input part based on the search result.

B25.1. The method of paragraph B25, further comprising providing the user a completed quote after the cost estimation process.

B25.2. The method of any of paragraphs B25-B25.1, wherein the guiding includes at least one of (a) prompting the user to input one or more costing parameters and (b) extracting and/or estimating one or more of the costing parameters from the search results, wherein the costing parameters include at least one physical property relating to the input part, a stock piece property, a machining operation parameter, an NRE parameter, a part quantity, and a part delivery parameter.

B25.2.1. The method of paragraph B25.2, wherein stock piece properties include one or more of a stock piece model, a stock piece size, a stock piece mass, a stock piece density, a stock piece cost, and a stock piece cost per mass.

B25.2.2. The method of any of paragraphs B25.2-B25.2.1, wherein machining operation parameters include one or more of a machine type, a forming type, a setup cost, a setup time, a setup cost rate, a machining cost, a machining time, a machining cost rate, and a number of operations, and optionally wherein the forming type is at least one of subtractive manufacturing, milling, drilling, turning, additive manufacturing, molding, casting, stamping, folding, coating, and assembling.

B25.2.3. The method of any of paragraphs B25.2-B25.2.2, wherein the NRE parameters include one or more of fixturing parameters, CAM programming parameters, and inspection parameters; wherein the fixturing parameters include one or more of hardware type, hardware cost, fixture production time, fixture production cost, fixture production cost rate, fixture setup time, fixture setup cost, and fixture setup cost rate; wherein the CAM programming parameters include one or more of CAM programming time, CAM programming cost, and CAM programming cost rate; and wherein the inspection parameters include one or more of inspection time, inspection cost, and inspection cost rate.

B26. The method of any of paragraphs B1-B25.2.3, further comprising creating a task relating to the input part based on the search result, wherein the task includes an owner and a milestone date, and wherein the owner and/or milestone date is extracted and/or estimated from the search result.

B26.1. The method of paragraph B26, further comprising presenting and/or displaying the task.

B26.2. The method of any of paragraphs B26-B26.1, wherein the milestone date is a due date.

B26.3. The method of any of paragraphs B26-B26.2, wherein the task includes at least one of quoting, programming, fabricating, and delivering.

B27. The method of any of paragraphs B1-B26.3, further comprising providing machining code relating to at least one of the stored 3D models of the search result.

B27.1. The method of paragraph B27, wherein the providing the machining code includes at least one of storing a machining code file in a user-defined and/or predetermined location, providing a link to a machining code file, displaying the machining code, and/or simulating the machining code; and optionally wherein the machining code file includes the machining code.

B27.2. The method of any of paragraphs B27-B27.1, further comprising receiving, from the user, a selected 3D model from the search result, and optionally wherein the providing the machining code includes providing the machining code associated with the selected 3D model.

B27.2.1. The method of paragraph B27.2, wherein the receiving the selected 3D model includes receiving a selected machining feature of the selected 3D model.

B27.2.1.1. The method of paragraph B27.2.1, wherein the selected machining feature is identified by a selected surface of the selected 3D model.

B27.2.1.2. The method of any of paragraphs B27.2.1-B27.2.1.1, wherein the providing the machining code includes providing the machining code associated with the selected machining feature.

B27.2.1.3. The method of any of paragraphs B27.2.1-B27.2.1.2, wherein the providing the machining code includes providing at least one of a production cost, a relative production cost, a production time, and a relative production time associated with the selected machining feature.

B27.2.2. The method of any of paragraphs B27.2-B27.2.1.3, wherein the receiving the selected 3D model includes receiving a plurality of selected 3D models, and the method further comprises providing at least one of an average production cost, a weighted average production cost, an average production time, and a weighted average production time of the plurality of selected 3D models.

B28. The method of any of paragraphs B1-B27.2.2, wherein one or more, and optionally substantially all or all, of the stored 3D models of the machining knowledge database correspond to respective formed parts.

B28.1. The method of paragraph B28, wherein the machining knowledge database includes machining code associated with the stored 3D models of the formed parts, and wherein the machining code was utilized to fabricate the respective formed parts.

B28.1.1. The method of paragraph B28.1, wherein the providing the visual comparison includes providing machining code associated with at least one of the stored 3D models of the search result.

B29. The method of any of paragraphs B1-B28.1.1, wherein the machining knowledge database associates one or more, and optionally substantially all or all, of the stored 3D models with one or more stored physical properties of a/the respective formed part, and optionally wherein the stored physical property includes at least one of a material type, a formed part bounding box, a formed part volume, a formed part volume removed, a formed part volume added, a formed part mass, a formed part density, a formed part surface area, a formed part surface finish, a formed part surface treatment, and a formed part surface coating.

B30. The method of any of paragraphs B1-B29, wherein the machining knowledge database associates one or more, and optionally substantially all or all, of the stored 3D models with stored auxiliary information relating to fabrication of a/the respective formed part.

B30.1. The method of paragraph B30, wherein the stored auxiliary information includes at least one of (the) one or more stored physical properties, a fabrication machine type, a fabrication tool type, a fabrication stock piece model, and a fabrication stock piece size.

B30.2. The method of any of paragraphs B30-B30.1, wherein the stored auxiliary information includes a fabrication forming type, and optionally wherein the fabrication forming type is at least one of subtractive manufacturing, milling, drilling, turning, additive manufacturing, molding, casting, stamping, folding, coating, and assembling.

B31. The method of any of paragraphs B1-B30.2, wherein the machining knowledge database associates one or more, and optionally substantially all or all, of the stored 3D models with one or more machining features of the respective stored 3D models.

B31.1. The method of paragraph B31, wherein at least one, optionally each, of the machining features in the machining knowledge database includes, optionally is, a stored 3D model in the machining knowledge database, optionally wherein the stored 3D model of the machining feature is a negative geometry model of the machining feature.

B31.2. The method of any of paragraphs B31-B31.1, wherein each of the machining features in the machining knowledge database is associated with machining feature code, and optionally wherein the machining feature code is a subset of a/the machining code associated with the respective stored 3D model.

B31.3. The method of any of paragraphs B31-B31.2, wherein each of the machining features in the machining knowledge database is associated with at least one of a production cost, a relative production cost, a production time, and a relative production time of the machining feature.

B32. The method of any of paragraphs B1-B31.3, wherein the search query includes, optionally is, at least one of a 3D model, a 3D sketch, a 2D model, a 2D sketch, and a 2D image.

B33. The method of any of paragraphs B1-B32, wherein the shape metric corresponds to geometric attributes of the search query.

B34. The method of any of paragraphs B1-B33, wherein the input part is a part to be fabricated.

B35. The method of any of paragraphs B1-B34, wherein the user is a person, a client device, and/or a client process.

B36. The method of any of paragraphs B1-B35, wherein the machining code is at least one of forming code, code for a forming machine, code for a 3D printer, code for a NC machine, and G-code.

B37. A computerized system for querying a machining knowledge database, the computerized system comprising:
  a computer-readable memory;
  a processing unit operatively coupled to the computer-readable memory; and
  a computer-readable storage media assemblage, wherein the storage media assemblage is operatively coupled to the computer-readable memory and includes instructions that, when executed by the processing unit, cause the computerized system to perform the method of any of paragraphs B1-B36.

C1. A method for utilizing stored information of a machining knowledge database, the method comprising:
  providing a search query that describes an input part;
  requesting a search of a machining knowledge database for one or more stored 3D models of formed parts similar to the input part, wherein the search is based at least in part on one or more geometric attributes of the input part and one or more physical properties relating to the input part;
  receiving a search result including one or more stored 3D models from the machining knowledge database that are similar to the input part; and
  comparing the search query to the search result.

C2. The method of paragraph C1, wherein the search query includes an input representation of the input part.

C3. The method of any of paragraphs C1-C2, wherein the search query includes one or more physical properties related to the input part, and wherein the physical properties include at least one of a material type, an input part bounding box, an input part volume, an input part volume removed, an input part volume added, an input part mass, an input part density, an input part surface area, an input part surface finish, an input part surface treatment, and an input part surface coating.

C4. The method of any of paragraphs C1-C3, wherein the search query includes auxiliary information relating to the input part.

C4.1. The method of paragraph C4, wherein the auxiliary information includes at least one of the) one or more physical properties relating to the input part, a machine type, a tool type, a stock piece model, and a stock piece size.

C4.2. The method of any of paragraphs C4-C4.1, wherein the auxiliary information includes a forming type, and optionally wherein the forming type is at least one of subtractive manufacturing, milling, drilling, turning, additive manufacturing, molding, casting, stamping, folding, coating, and assembling.

C5. The method of any of paragraphs C1-C4.2, wherein the geometric attributes include global and local attributes.

C6. The method of any of paragraphs C1-05, wherein the geometric attributes include an input machining feature of the input part.

C7. The method of any of paragraphs C1-C6, wherein the search query includes an input machining feature descriptor, wherein the search is based at least in part on the search query, and wherein the machining feature descriptor includes at least one of an/the input machining feature, a 3D model of the input machining feature, a negative geometry model of the input machining feature, a surface of the input machining feature, a textual description of the input machining feature, a keyword description of the input machining feature, a 2D image of the input machining feature, a 2D sketch of the input machining feature, and a 3D sketch of the input machining feature.

C8. The method of any of paragraphs C1-C7, wherein the search is based upon the search query.

C9. The method of any of paragraphs C1-C8, further comprising requesting a refined search based on a refined search criterion, and receiving an updated search result that includes one or more stored 3D models similar to the input part based upon the refined search criterion.

C10. The method of any of paragraphs C1-C9, further comprising fabricating the input part based at least partially on the search result and/or information related to the search result.

C11. The method of any of paragraphs C1-C10, further comprising estimating the cost to manufacture the input part based at least partially on the search result and/or information related to the search result, and optionally wherein the method further comprises providing and/or displaying the estimated cost.

C12. The method of any of paragraphs C1-C11, further comprising reviewing machining code associated with at least one of the stored 3D models of the search result.

C13. The method of any of paragraphs C1-C12, further comprising accessing information relating to one or more of the stored 3D models of the search result.

C13.1. The method of paragraph C13, wherein the information includes at least one of machining code associated with the stored 3D model, a machining feature of the stored 3D model, a physical property related to the stored 3D model, a production summary related to the stored 3D model, and auxiliary information relating to the stored 3D model; wherein the auxiliary information includes at least one of a machine type, a tool type, a stock piece model, a stock piece size, and a forming type.

C13.1.1. The method of paragraph C13.1, wherein the forming type is at least one of subtractive manufacturing, milling, drilling, turning, additive manufacturing, molding, casting, stamping, folding, coating, and assembling.

C13.1.2. The method of any of paragraphs C13.1-C13.1.1, wherein the production summary includes at least one of production cost, NRE (non-recurring engineering) cost, fabrication cost, production time, NRE time, fabrication time, and delivery time.

C14. The method of any of paragraphs C2-C13.1.2, wherein the input representation is as described by any of paragraphs A1-A40.

C15. The method of any of paragraphs C1-C14, wherein the machining knowledge database is as described by any of paragraphs A1-A40.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

The various disclosed elements of systems and apparatuses, and steps of methods disclosed herein are not required of all systems, apparatuses and methods according to the present disclosure, and the present disclosure includes all novel and non-obvious combinations and subcombinations of the various elements and steps disclosed herein. Moreover, any of the various elements and steps, or any combination of the various elements and/or steps, disclosed herein may define independent inventive subject matter that is separate and apart from the whole of a disclosed system, apparatus, or method. Accordingly, such inventive subject matter is not required to be associated with the specific systems, apparatuses and methods that are expressly disclosed herein, and such inventive subject matter may find utility in systems and/or methods that are not expressly disclosed herein.

INDUSTRIAL APPLICABILITY

The systems and methods disclosed herein are applicable to mechanical manufacturing industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method for utilizing stored information of a machining knowledge database, the method comprising:
    receiving, by a computing device, a search query that describes an input part;
    parsing the search query to identify one or more input machining features of the input part, wherein each input machining feature corresponds to a collection of one or more surfaces to be formed via at least one toolpath of a corresponding machining tool;
    performing, by the computing device and based at least in part on the one or more input machining features, a search of a machining knowledge database for one or more stored 3D models of formed parts similar to the input part, wherein the one or more stored 3D models of formed parts include a particular 3D model of a previously formed part, wherein the machining knowledge database stores a first machining code previously used to fabricate at least a first machining feature of the previously formed part in association with the particular 3D model, and wherein the search is based at least in part on:
    one or more geometric attributes of the input part,
    one or more physical properties relating to the input part, wherein the one or more physical properties of the input part include an input part bounding box, and
    an input part signature that includes a volumetric difference between the input part bounding box and the input part;
    generating, by the computing device and based at least in part on the search, a search result that includes the one or more stored 3D models from the machining knowledge database that are similar to the input part;
    receiving, by the computing device, an input associated with the particular 3D model;
    accessing, based at least in part on the input, the first machining code previously used to fabricate at least the first machining feature of the previously formed part; and
    storing a second machining code for a fabricating machine to form at least a second machining feature of the input part, wherein the second machining code is generated based at least in part on the first machining code.

2. The method of claim 1, further comprising causing the fabricating machine to form at least the second machining feature of the input part based at least partially on the second machining code.

3. The method of claim 1, wherein parsing the search query includes determining the one or more input machining features based on at least one of a 3D model of the input machining feature, a negative geometry model of the input machining feature, a surface of the input machining feature, a textual description of the input machining feature, a keyword description of the input machining feature, a 2D image of the input machining feature, a 2D sketch of the input machining feature, and a 3D sketch of the input machining feature.

4. The method of claim 1, wherein the one or more physical properties relating to the input part include at least one of an input part surface finish, an input part surface treatment, and an input part surface coating.

5. The method of claim 1, wherein the corresponding machining tool is a tool that is utilized in at least one of a milling process and an additive manufacturing process, and wherein the corresponding machining tool includes at least one of a milling cutter, a drill bit, a cutting tool, a tool bit, a rotary file, a laser source, an electron beam source, an extruder head, and a nozzle.

6. A computerized method for querying a machining knowledge database, the method comprising:
    receiving, from a user, a search query that describes an input part;
    determining an input part signature that includes (i) a shape metric that corresponds to geometric attributes of the input part and (ii) one or more physical properties of the input part, wherein the one or more physical properties of the input part include an input part bounding box, and wherein the determining the input part signature includes computing a volumetric difference between the input part bounding box and the input part;
    searching a machining knowledge database for one or more stored 3D models of formed parts similar to the input part, wherein the searching is based at least in part on the input part signature and the one or more physical properties of the input part, wherein the machining knowledge database includes at least (i) one or more stored 3D models of formed parts associated with respective stored part signatures, (ii) a machining code relating to a particular stored 3D model of the one or more stored 3D models, and (iii) one or more respective physical properties of the respective stored 3D models, wherein the stored part signatures correspond to geometric attributes of the respective stored 3D models;
    generating a search result that includes one or more of the stored 3D models of the machining knowledge database that are similar to the input part; and
    providing a visual comparison of the search query and the search result to the user.

7. The method of claim 6, further comprising providing the machining code relating to the particular stored 3D model.

8. The method of claim 6, wherein the search query includes an input machining feature descriptor; wherein the searching is based at least in part on the machining feature descriptor; and wherein the machining feature descriptor includes at least one of an input machining feature, a 3D model of the input machining feature, a negative geometry model of the input machining feature, a surface of the input machining feature, a textual description of the input machining feature, a keyword description of the input machining feature, a 2D image of the input machining feature, a 2D sketch of the input machining feature, and a 3D sketch of the input machining feature; and wherein the input machining feature corresponds to a collection of one or more surfaces to be formed via at least one toolpath of a corresponding machining tool.

9. The method of claim 6, wherein the respective physical properties of the respective stored 3D models include at least one of a bounding box, a volume removed, and a volume added.

10. The method of claim 6, wherein the searching includes searching the machining knowledge database for one or more stored 3D models that include at least one machining feature that is similar to at least one machining feature of the input part, wherein each of the at least one machining feature of the one or more stored 3D models corresponds to a collection of one or more surfaces formed via at least one toolpath of a corresponding machining tool.

11. The method of claim 6, wherein the providing includes visualizing, responsive to user inputs, at least a portion of the search query and one or more of the stored 3D models of the search result.

12. The method of claim 6, wherein the providing includes visualizing one or more differences between the search query and one or more of the stored 3D models of the search result.

13. The method of claim 6, further comprising providing a production summary corresponding to at least one of the stored 3D models of the search result.

14. The method of claim 6, further comprising guiding the user through a cost estimation process for the input part based on the search result.

15. The method of claim 6, wherein the computing the volumetric difference between the input part bounding box and the input part includes computing at least one of an input part volume removed relative to the bounding box and an input part volume added relative to the bounding box.

16. A computerized method for searching a machining knowledge database, comprising:
receiving, from a user, an input representation of an input part;
parsing the input representation of the input part to identify one or more input machining features of the input part, wherein each input machining feature corresponds to a collection of one or more surfaces to be formed via at least one toolpath of a corresponding machining tool; wherein the parsing the input representation of the input part to identify the one or more input machining features of the input part includes determining a bounding box around the input part, and determining a box volumetric difference between the bounding box and the input part;
determining an input part signature that includes a shape metric corresponding to geometric attributes of the input part, the one or more input machining features, and the box volumetric difference;
associating the input representation with the input part signature in a machining knowledge database;
searching the machining knowledge database for one or more stored 3D models of formed parts similar to the input part, wherein the searching is based at least in part on the input part signature, wherein the machining knowledge database includes at least (i) one or more stored 3D models of formed parts associated with respective stored part signatures and (ii) a machining code associated with a particular stored 3D model of the one or more stored 3D models, wherein the stored part signatures correspond to geometric attributes of the respective stored 3D models;
generating a search result that includes one or more of the stored 3D models of the machining knowledge database that are similar to the input part; and
providing the search result to the user.

17. The method of claim 16, further comprising receiving one or more physical properties relating to the input part, wherein the searching includes searching based at least in part on the one or more physical properties.

18. The method of claim 16, further comprising receiving auxiliary information relating to at least one of the input representation and the input part, wherein the searching includes searching based at least in part on the auxiliary information, wherein the auxiliary information includes a forming type that is at least one of milling and additive manufacturing.

19. The method of claim 16, wherein the parsing the input representation of the input part to identify the one or more input machining features of the input part further includes computing, based at least in part on the bounding box, a negative geometry of a 3D model of the input part.

20. The method of claim 16, further comprising associating each of the one or more input machining features with the input representation in the machining knowledge database.

21. The method of claim 16, further comprising receiving one or more search criteria from the user, wherein the one or more search criteria includes at least one of a geometric attribute, a physical property, and auxiliary information related to the input part, and further comprising at least one of searching and repeating the searching, based at least in part on the search criteria.

22. The method of claim 16, further comprising guiding the user through a cost estimation process and providing the user a completed quote after the cost estimation process, wherein the guiding includes prompting the user to input at least one of a physical property, a stock piece property, a machining operation parameter, a non-recurring engineering parameter, a part quantity, and a part delivery parameter.

23. The method of claim 16, wherein the parsing the input representation of the input part to identify the one or more input machining features of the input part further includes computing, based at least in part on the bounding box, a positive geometry of a 3D model of the input part.

24. The method of claim 17, further comprising associating the one or more physical properties relating to the input part with the input representation in the machining knowledge database.

* * * * *